United States Patent [19]
Ito et al.

[11] Patent Number: 5,122,664
[45] Date of Patent: Jun. 16, 1992

[54] METHOD AND APPARATUS FOR QUANTITATIVELY ANALYZING BONE CALCIUM

[75] Inventors: Wataru Ito; Nobuyoshi Nakajima; Kazuo Shimura, all of Kanagawa, Japan

[73] Assignee: Fuji Photo Film Co., Ltd., Kanagawa, Japan

[21] Appl. No.: 691,900

[22] Filed: Apr. 26, 1991

[30] Foreign Application Priority Data

| Apr. 27, 1990 | [JP] | Japan | 2-114611 |
| Jan. 31, 1991 | [JP] | Japan | 3-10597 |
| Jan. 31, 1991 | [JP] | Japan | 3-10598 |
| Jan. 31, 1991 | [JP] | Japan | 3-10599 |
| Mar. 28, 1991 | [JP] | Japan | 3-64288 |

[51] Int. Cl.⁵ .............................. G01N 23/04
[52] U.S. Cl. ................... 250/327.2; 378/53; 378/207
[58] Field of Search .......... 250/327.2, 484.1; 378/53, 207, 56

[56] References Cited

U.S. PATENT DOCUMENTS

| 4,590,517 | 5/1986 | Kato et al. | 250/484.1 B |
| 4,811,373 | 3/1989 | Stein | 378/146 |
| 4,855,598 | 8/1989 | Ohgoda et al. | 250/484.1 B |

Primary Examiner—Carolyn E. Fields
Attorney, Agent, or Firm—Sughrue, Mion, Zinn, Macpeak & Seas

[57] ABSTRACT

At least two stimulable phosphor sheets are exposed to at least two kinds of radiation, which have different energy distributions, without an object intervening between the stimulable phosphor sheets and a source of the radiation. The stimulable phosphor sheets are then exposed to stimulating rays, which cause them to emit light in proportion to the amount of energy stored thereon during their exposure to the radiation. The light emitted is photoelectrically detected, and digital image signals are thereby obtained, which are to be used for compensating for nonuniformity in how the radiation is irradiated to the stimulable phosphor sheets. Digital image signals representing radiation images of an object stored with at least two kinds of radiation and the corresponding digital image signals for the compensation are then subtracted from each other, and digital image signals are obtained which are free of noise due to nonuniformity in how at least two kinds of radiation are irradiated to the stimulable phosphor sheets. The digital image signals, which are free of noise, are then subtracted from each other, and a difference signal is thereby obtained which represents the image of only the bones represented by the radiation images. Bone calcium in the bones is quantitatively analyzed by utilizing the difference signal.

23 Claims, 12 Drawing Sheets

F I G . 3
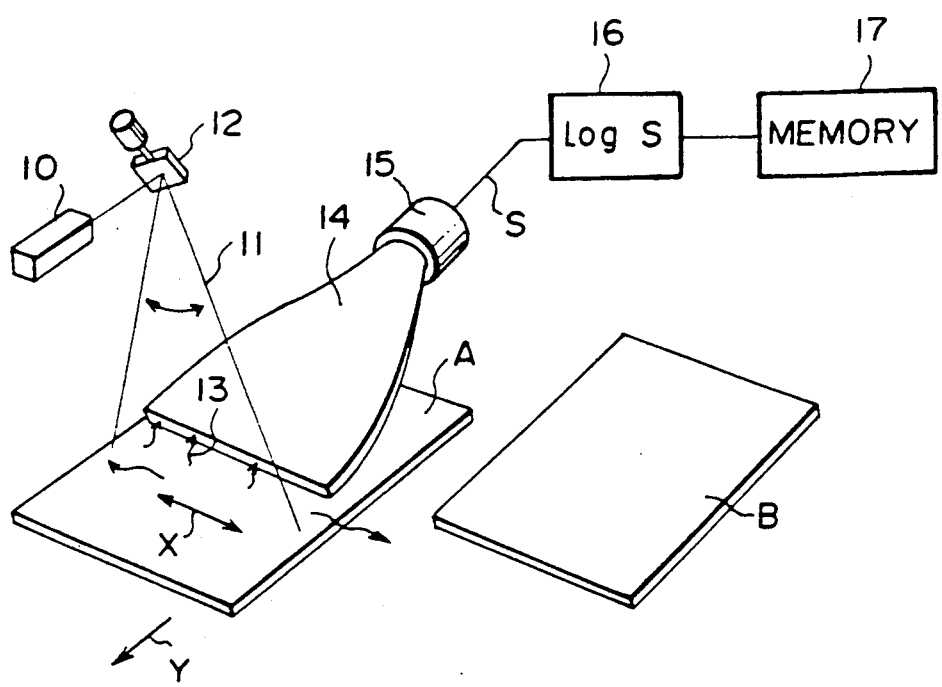

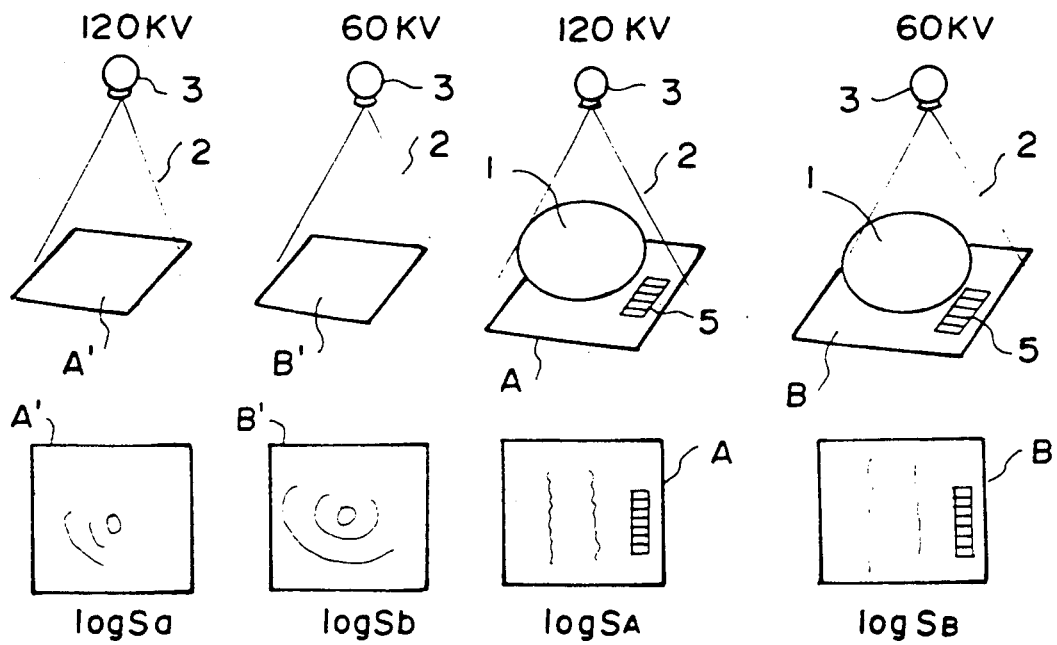
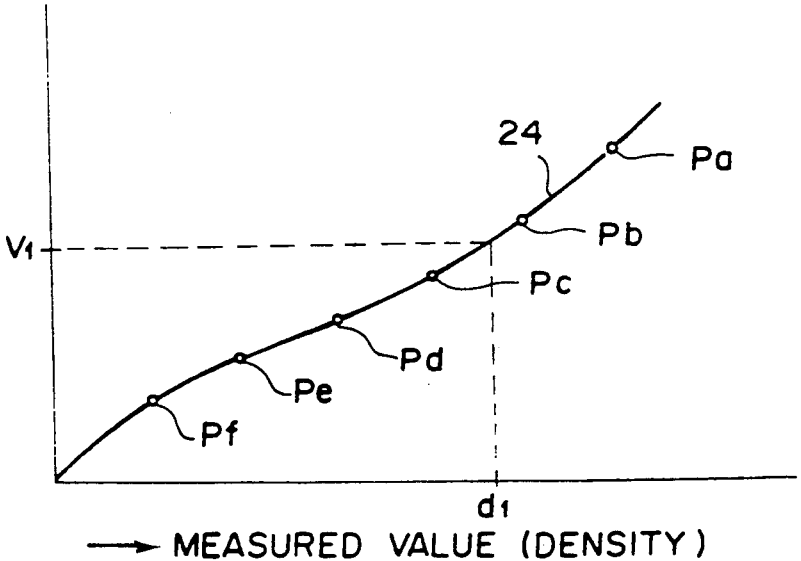

F I G. 11
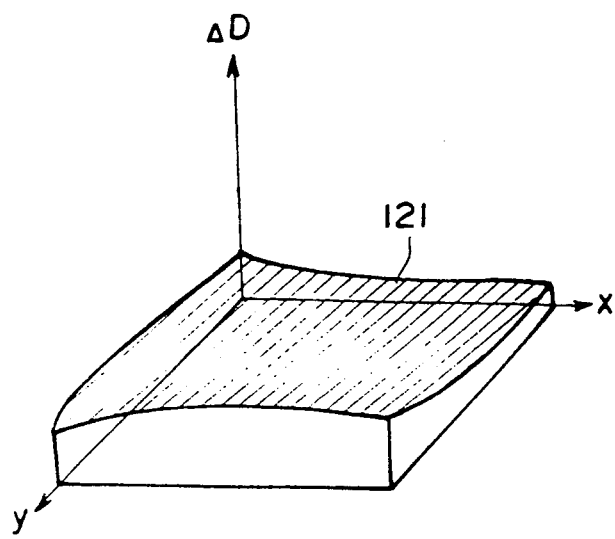
F I G. 12
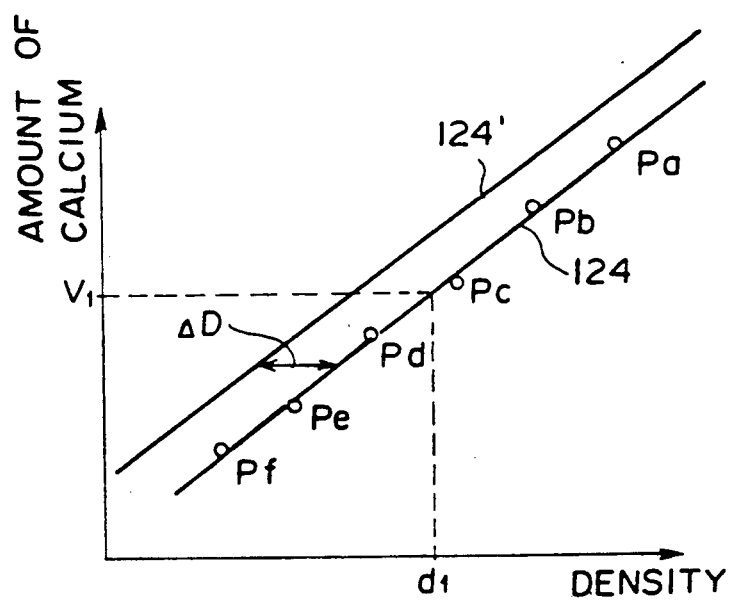

METHOD AND APPARATUS FOR QUANTITATIVELY ANALYZING BONE CALCIUM

BACKGROUND OF THE INVENTION

1. Field of the Invention

This invention relates to a method for quantitatively determining amounts of calcium in bones of a human body, or the like, and an apparatus for carrying out the method. This invention particularly relates to a method for quantitatively analyzing bone calcium, wherein stimulable phosphor sheets are used and an energy subtraction processing technique is utilized, and an apparatus for carrying out the method.

2. Description of the Prior Art

Quantitatively determining amounts of calcium in bones is necessary for preventing fractures of bones. Specifically, by investigating small changes in the amounts of calcium contained in bones, osteoporosis can be found early, and fractures of the bones can be prevented.

Therefore, various methods for quantitatively determining amounts of calcium in bones have been proposed and used in practice. Such methods are listed below.

i) Microdensitometry (MD method):

With the MD method, a middle finger bone and an aluminum step wedge (a step-like pattern) are simultaneously exposed to X-rays, and an X-ray image is thereby recorded which is composed of a pattern of the middle finger bone and a pattern of the aluminum step wedge. The image density of the X-ray image is then determined by using a densitometer. Thereafter, the X-ray absorption amount of the middle finger bone is calculated with reference to the pattern of the aluminum step wedge and corrected in accordance with the width of the bone. In this manner, the amount of calcium in the bone is determined quantitatively. This method can be carried out with a simple apparatus. However, this method has the drawbacks in that the accuracy, with which the amounts of calcium in bones are determined quantitatively, cannot be kept high, and amounts of calcium in vertebral bones, which very well indicate the sign of an osteoporosis, cannot be determined.

ii) Single photon absorptiometry (SPA method):

With the SPA method, γ-rays having a low energy level are irradiated to a bone, and the γ-rays, which have passed through the bone, are detected by a scintillation detector spaced approximately 15 cm away from the bone. An analog calculation is made from a change in the count of the γ-ray quanta, and the weight of the bone per unit length is thereby calculated. With this method, amounts of calcium in bones can be determined more accurately than the MD method. However, this method has the drawbacks in that amounts of calcium in vertebral bones cannot be determined, a particular management must be done during the use of a radioisotope, and the source of the radiation must be exchanged frequently because of its half-life.

iii) Dual photon absorptiometry (DPA method):

With the DPA method, a nuclide, Gl153, which has two energy peaks of 44 keV and 100 keV, is employed as a radiation source. The amount of calcium in a bone is determined from a difference between the amounts of the two types of radiations having different energy levels, which have passed through a bone. This method is advantageous in that amounts of calcium in lumbar vertebrae and cervixes of thighbones can be determined, and the amount of calcium in bones of the whole body and the amount of fat of the whole body can be determined accurately. However, this method has the drawbacks accompanying the use of a radioisotope. Also, in order for radiation to be scanned, a long time is taken for the inspection to be carried out (for example, a time of more than ten minutes is required when the sample is a lumbar vertebra, and a time of 30 to 40 minutes is required when the sample is the whole body).

iv) Quantitative digited radiography (QDR method or DPX method):

The QDR method comprises nearly the same steps as those of the DPA method, except that, instead of a radioisotope being used, a pulsed X-ray source is combined with a filter in order to yield two types of radiation having different energy levels. With this method, good reproducibility can be obtained, and the inspection time can be kept comparatively short (approximately one third of the time required in the DPA method). This method is most advantageous from the point of view of simplicity and performance. However, the inspection time required is not very short (e.g. a time of as long as approximately six minutes is required when the sample is a lumbar vertebra), and should be kept shorter.

v) Quantitative computer tomography (QCT method):

With the QCT method, an X-ray CT scanner is used, and the amount of calcium in, primarily, the third lumbar vertebra is determined on the basis of the CT number. In order to carry out this method, a large-scaled apparatus must be used.

vi) Dual energy quantitative computer tomography (DQCT method):

The DQCT method is carried out in the same manner as that in the QCT method, except that two types of radiation having different energy levels are utilized and energy subtraction processing is carried out. This method is advantageous in that quantitative determination can be carried out which is free of adverse effects of fat contained in bone tissues. However, in order to carry out this method, a large-scaled apparatus must be used.

As described above, the conventional methods for quantitatively analyzing bone calcium, which are simple, have the problem in that the accuracy of determination cannot be kept high. Also, the conventional methods for quantitatively analyzing bone calcium, wherein the accuracy of determination can be kept high, have the problems in that large-scaled apparatuses must be used to carry out the methods and a long time is required for the determination to be carried out.

SUMMARY OF THE INVENTION

The primary object of the present invention is to provide a method for quantitatively analyzing bone calcium, which is simple, and in which amounts of calcium in bones can be determined accurately and quickly.

Another object of the present invention is to provide an apparatus for carrying out the method for quantitatively analyzing bone calcium.

A further object of the present invention is to provide a method for quantitatively analyzing bone calcium, wherein energy subtraction processing is employed, and the accuracy of determination is kept high by eliminating errors due to adverse effects of radiation scattered by tissues of an object, or the like.

The present invention provides a first method for quantitatively analyzing bone calcium by carrying out energy subtraction processing wherein each of at least two stimulable phosphor sheets is exposed to one of at least two kinds of radiation, which have different energy distributions and have passed through an object constituted of bones and soft tissues, radiation images of the object are thereby stored on the stimulable phosphor sheets, each of the stimulable phosphor sheets is thereafter exposed to stimulating rays, which cause the stimulable phosphor sheet to emit light in proportion to the amount of energy stored thereon during its exposure to the radiation, the emitted light is photoelectrically detected and converted into a digital image signal made up of a series of image signal components representing each said radiation image, the image signal components of the digital image signals thus obtained, which image signal components represent corresponding picture elements in the radiation images, are then subtracted from each other, and a difference signal is thereby obtained which represents the image of only the bones represented by the radiation images, the method for quantitatively analyzing bone calcium comprising the steps of:

i) exposing each of at least two stimulable phosphor sheets to one of at least two said kinds of radiation, which have different energy distributions, without said object intervening between the stimulable phosphor sheet and a source of the radiation, ii) thereafter exposing each of the stimulable phosphor sheets to the stimulating rays, which cause the stimulable phosphor sheet to emit light in proportion to the amount of energy stored thereon during its exposure to the radiation, iii) photoelectrically detecting the light emitted by each of the stimulable phosphor sheets, a digital image signal being thereby obtained, which is to be used for compensating for nonuniformity in how the radiation is irradiated to the stimulable phosphor sheet, whereby at least two digital image signals to be used for the compensation are obtained with respect to at least two said kinds of radiation, which have different energy distributions, iv) subtracting said digital image signals, which represent said radiation images of said object stored with at least two said kinds of radiation having different energy distributions, and the corresponding digital image signals, which are to be used for the compensation, from each other, whereby digital image signals are obtained which are free of noise due to nonuniformity in how at least two said kinds of radiation are irradiated to the stimulable phosphor sheets, v) subtracting said digital image signals, which are free of noise, from each other, said difference signal being thereby obtained which represents the image of only the bones represented by said radiation images, and vi) quantitatively analyzing bone calcium in said bones by utilizing said difference signal.

The first method for quantitatively analyzing bone calcium in accordance with the present invention may be modified such that, when each of said radiation images of said object is stored on each of said stimulable phosphor sheets, a pattern of a bone calcium reference material is stored together with the pattern of said object, said bone calcium reference material being constituted of a plurality of sections the radiation absorption amounts of which are known and vary step-wise, and a quantitative analysis of bone calcium is made from the image of the bones of said object by referring to the pattern of said bone calcium reference material.

With the first method for quantitatively analyzing bone calcium in accordance with the present invention, bone calcium is analyzed quantitatively by utilizing energy subtraction processing wherein stimulable phosphor sheets are used. In order for the quantitative analysis to be enabled, the digital image signals, on which energy subtraction processing is to be carried out, are corrected such that noise due to nonuniformity in how at least two kinds of radiation are irradiated to the stimulable phosphor sheets may be eliminated.

Therefore, a quantitative analysis of bone calcium can be made accurately, simply, and quickly.

Specifically, image recording operations can be carried out simply by using the stimulable phosphor sheets as the recording media. Therefore, image recording apparatuses, which have heretofore been used, can be utilized directly. Also, radiation may be irradiated to the whole surface of each stimulable phosphor sheet, and therefore the image recording operation can be carried out quickly. Additionally, the stimulable phosphor sheet stores a radiation image more accurately than X-ray film. Therefore, the radiation dose to the object may be kept as low as fractions of tenths of the value required in ordinary X-ray image recording operations using X-ray film. Quantitative determination of bone calcium is necessary for, in particular, aged persons. However, keeping a predetermined body orientation for a long time has been a heavy burden to the aged persons. The first method for quantitatively analyzing bone calcium in accordance with the present invention relieves such burden.

Also, with the first method for quantitatively analyzing bone calcium in accordance with the present invention, the pattern of the bone calcium reference material (a phantom) is stored together with the image pattern of the object. The bone calcium reference material is constituted of a plurality of sections the radiation absorption amounts of which are known and vary step-wise. Therefore, the image density of the patterns of the bones of the object, on which the quantitative analysis of bone calcium is to be carried out, can be compared with several levels of image density of the step-like sections of the bone calcium reference material. Part of the step-like sections, the image density of which is closest to the image density of the patterns of the bones of the object, can thus be found. From the amount of bone calcium associated with the part of the step-like sections, which has thus been found, the amount of bone calcium in the bones can be determined.

A calibration curve, or the like, is prepared, which indicates the relationship between the image densities of the step-like sections of the phantom and the amounts of bone calcium. By referring to the calibration curve, the amount of bone calcium (a true value) in the bones can be found from the image density (a measured value) of the part of the step-like sections of the phantom.

Comparison of the image density may be carried out visually by displaying the image on a reproducing apparatus, such as a CRT display device. Alternatively, the comparison may be carried out by electrically rating the difference signal (the energy subtraction signal).

In a second method for quantitatively analyzing bone calcium in accordance with the present invention, information representing the body thickness of the patient is obtained. Distributions of scattered radiation are predicted from the information representing the body thickness of the patient. The digital image signals, which have been compensated for nonuniformity in how at least two said kinds of radiation are irradiated to the stimulable phosphor sheets, are then compensated for the distributions of scattered radiation.

Therefore, with the second method for quantitatively analyzing bone calcium in accordance with the present invention, a more accurate quantitative analysis of bone calcium can be made automatically.

The present invention also provides a third method for quantitatively analyzing bone calcium, which comprises the steps of:

i) exposing each of a plurality of recording media to one of several kinds of radiation, which have different energy distributions and have passed through an object and a bone calcium reference material, which simulates amounts of bone calcium varying step-wise, the object being constituted of bones and soft tissues, whereby a plurality of radiation images are recorded on the recording media, ii) forming a bone image, in which only the patterns of the bones of the object have been formed or emphasized, from the plurality of the radiation images, and iii) quantitatively analyzing bone calcium in the bones by comparing the image density of the patterns of the bones with the image density of the pattern of the bone calcium reference material, both patterns appearing in the bone image, wherein the improvement comprises the steps of:

a) when each of the plurality of said radiation images is recorded on each of said recording media, recording patterns of a plurality of bone calcium blocks, which are spaced away from one another and simulate a predetermined amount of bone calcium, together with the pattern of said object and the pattern of said bone calcium reference material on each said recording medium, b) obtaining said bone image from the plurality of said radiation images, which have thus been recorded, c) forming a calibration curve from image densities of said patterns of the plurality of said bone calcium blocks, which patterns appear in said bone image, said calibration curve being used in compensating for a difference in the image density for different positions of patterns of part of said object and part of said bone calcium reference material, which parts have a predetermined amount of bone calcium, in said bone image, and d) in accordance with said calibration curve, eliminating an error in finding the amount of bone calcium in a specific part of the bones, which error is caused to occur by a difference in the position between the pattern of said specific part of the bones and the pattern of said bone calcium reference material in said bone image.

The present invention further provides a fourth method for quantitatively analyzing bone calcium, which comprises the steps of:

i) exposing each of a plurality of recording media to one of several kinds of radiation, which have different energy distributions and have passed through an object and a bone calcium reference material, which simulates amounts of bone calcium varying step-wise, the object being constituted of bones and soft tissues, whereby a plurality of radiation images are recorded on the recording media, ii) forming a bone image, in which only the patterns of the bones of the object have been formed or emphasized, from the plurality of the radiation images, and iii) quantitatively analyzing bone calcium in the bones by comparing the image density of the patterns of the bones with the image density of the pattern of the bone calcium reference material, both patterns appearing in the bone image, wherein the improvement comprises the steps of:

a) detecting background signal components, which represent a background region other than said patterns of the bones and said pattern of said bore calcium reference material in said bone image, from an image signal made up of a series of image signal components representing said bone image, b) from said background signal components, which have thus been detected, predicting background signal components, which are superposed upon the image signal components representing said patterns of the bones and said pattern of said bone calcium reference material, c) forming a calibration curve from said background signal components, which have thus been predicted, said calibration curve being used in compensating for a difference in the image density for different positions of patterns of part of said object and part of said bone calcium reference material, which parts have a predetermined amount of bone calcium, in said bone image, and d) in accordance with said calibration curve, eliminating an error in finding the amount of bone calcium in a specific part of the bones, which error is caused to occur by a difference in the position between the pattern of said specific part of the bones and the pattern of said bone calcium reference material in said bone image.

The term "calibration curve" as used herein also embraces a calibration plane, such as a curved surface and a flat plane approximating the curved surface. As an aid in facilitating the explanation, such a calibration plane is herein referred to as the calibration curve.

With the third method for quantitatively analyzing bone calcium in accordance with the present invention, the patterns of a plurality of bone calcium blocks, which are spaced away from one another and simulate a predetermined amount of bone calcium, are recorded together with the pattern of the object and the pattern of the bone calcium reference material on each recording medium. The calibration curve (or the calibration curved surface) is formed on the basis of the patterns of the bone calcium blocks appearing in the bone image. The amount of bone calcium is corrected in accordance with the calibration curve (or the calibration curved surface). Therefore, the amount of bone calcium can be determined accurately by eliminating errors due to, for example, adverse effects of radiation scattered by tissues of an object, which adverse effects vary for different positions in the bone image.

With the fourth method for quantitatively analyzing bone calcium in accordance with the present invention, background signal components, which represent a background region other than the patterns of the bones and the pattern of the bone calcium reference material in the bone image, are detected from an image signal made up of a series of image signal components representing the bone image. From the background signal components, which have thus been detected, background signal components are predicted which are superposed upon the image signal components representing the patterns of the bones and the pattern of the bone calcium reference material. In this manner, the background signal components corresponding to the whole bone image are found. A calibration curve (or a calibration curved surface) is then formed from the background signal components, which have thus been found. The amount of bone calcium is corrected in accordance with the calibration curve (or the calibration curved surface). Therefore, the amount of bone calcium can be determined accurately by eliminating errors due to, for example, adverse effects of radiation scattered by tissues of an object, which adverse effects vary for different positions in the bone image.

The present invention still further provides a fifth method for quantitatively analyzing bone calcium, which comprises the steps of:

i) locating an object, which is constituted of bones and soft tissues, and a bone calcium reference material constituted of a plurality of bone calcium blocks, which simulate different amounts of bone calcium and have projected areas larger than the projected area of a specific part of the bones of said object, such that said specific part of the bones of said object and said bone calcium reference material overlap one upon the other in their projected image, ii) exposing each of a plurality of recording media to one of several kinds of radiation, which have different energy distributions and have passed through said object and said bone calcium reference material overlapping one upon the other, whereby a plurality of radiation images are recorded on the recording media, iii) forming a bone image, in which only the patterns of the bones of the object have been formed or emphasized, from the plurality of the radiation images, and iv) quantitatively determining the amount of bone calcium in said specific part of the bones by comparing the image density of the pattern of said specific part of the bones with the image density of the pattern of said bone calcium reference material, both patterns appearing in the bone image.

With the fifth method for quantitatively analyzing bone calcium in accordance with the present invention, the object and the bone calcium reference material having a projected area larger than the projected area of a specific part of the bones of the object are located such that the specific part of the bones of the object and the bone calcium reference material overlap one upon the other in their projected image. A plurality of radiation images are then recorded on recording media. Therefore, the pattern of the specific part of the bones and the pattern of the bone calcium reference material include the same level of effects from the scattered radiation, or the like. As a result, the adverse effects of the scattered radiation, or the like, at the pattern of the specific part of the bones and those at the pattern of the bone calcium reference material are canceled with each other. Accordingly, the amount of bone calcium in the specific part of the bones can be determined accurately.

The present invention also provides a sixth method for quantitatively analyzing bone calcium, which comprises the steps of:

i) blocking areas other than a specific part of bones of an object, which is constituted of the bones and soft tissues, and other than a bone calcium reference material, which simulates amounts of bone calcium varying step-wise, from radiation, said blocked areas being in the vicinity of said specific part of the bones and said bone calcium reference material, ii) exposing each of a plurality of recording media to one of several kinds of radiation, which have different energy distributions and have passed through said specific part of the bones of said object and said bone calcium reference material, whereby a plurality of radiation images are recorded on the recording media, iii) forming a bone image, in which only the patterns of the bones of the object have been formed or emphasized, from the plurality of the radiation images, and iv) quantitatively determining the amount of bone calcium in said specific part of the bones by comparing the image density of the pattern of said specific part of the bones with the image density of the pattern of said bone calcium reference material, both patterns appearing in the bone image.

With the sixth method for quantitatively analyzing bone calcium in accordance with the present invention, when each of the plurality of the radiation images is recorded, the areas other than the specific part of bones of the object and other than the bone calcium reference material are blocked from the radiation. Therefore, adverse effects from the scattered radiation can be minimized, and the amount of bone calcium in the specific part of the bones can be determined accurately.

The sizes of the windows for the specific part of the bones of the object and the bone calcium reference material, through which windows the radiation passes, should preferably be identical with each other. Also, the bone calcium reference material should preferably be located as close to the specific part of the bones of the object as possible.

BRIEF DESCRIPTION OF THE DRAWINGS

FIG. 3 is a perspective view showing how a radiation image is read out from a stimulable phosphor sheet, FIGS. 4A, 4B, 4C, and 4D are perspective views showing the recording steps in the first method for quantitatively analyzing bone calcium in accordance with the present invention, FIGS. 5A, 5B, 5C, and 5D are plan views showing examples of radiation images, which have been recorded with the recording steps of FIGS. 4A through 4D, FIG. 7 is a graph showing an example of a calibration curve, which indicates the relationship between the measured value (the image density) and the true value (the amount of bone calcium) and which is used in the first method for quantitatively analyzing bone calcium in accordance with the present invention, FIG. 11 is a graph showing a calibration curve (a calibration curved surface) for image density, which curve is obtained in the embodiment of the third method for quantitatively analyzing bone calcium in accordance with the present invention, FIG. 12 is a graph showing a curve indicating the relationship between the amount of bone calcium and the image density, which curve is obtained in the embodiment of the third method for quantitatively analyzing bone calcium in accordance with the present invention.

DESCRIPTION OF THE PREFERRED EMBODIMENTS

The present invention will hereinbelow be described in further detail with reference to the accompanying drawings.

An embodiment of the first method for quantitatively analyzing bone calcium in accordance with the present invention will first be described hereinbelow.

Figure 1A:
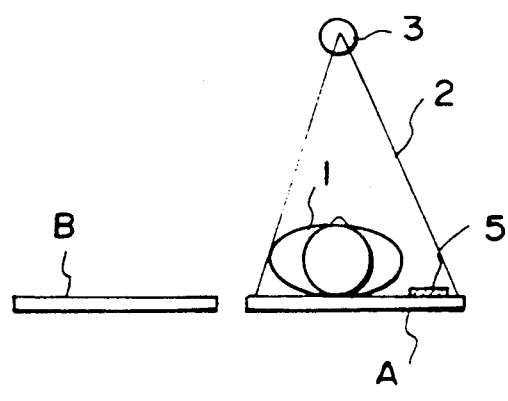
FIG. 1A is a side view showing an example of how radiation images of an object and a bone calcium reference material are recorded in an embodiment of the first method for quantitatively analyzing bone calcium in accordance with the present invention.

With reference to FIG. 1A stimulable phosphor sheets A and B are sequentially exposed to X-rays 2, which have passed through an object 1 constituted of bones and soft tissues and which have different energy levels. Specifically, first, an X-ray image of the object 1 is stored on the stimulable phosphor sheet A. Thereafter, the stimulable phosphor sheet A is quickly removed from the position for exposure to the X-rays 2, and the stimulable phosphor sheet B is quickly set at the position for exposure to the X-rays 2. At the same time, the tube voltage of the X-ray source 3 is changed so that it produces the X-rays 2 having a different energy level. In this manner, an X-ray image of the object 1 is stored on the stimulable phosphor sheet B with the X-rays 2 having the different energy level. The positions of the stimulable phosphor sheets A and B with respect to the position of the object 1 are kept the same.

Figure 2:
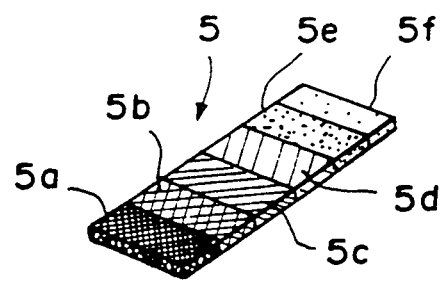
FIG. 2 is a perspective view showing an example of a phantom used in the first method for quantitatively analyzing bone calcium in accordance with the present invention.

At this time, a bone calcium reference material (a phantom) 5, which is constituted of a plurality of sections the radiation absorption amounts of which are known and vary step-wise, is placed on each of the stimulable phosphor sheets A and B. In this manner, a pattern of the phantom 5 and the pattern of the object 1 are stored together on each of the stimulable phosphor sheets A and B. As shown in FIG. 2, the phantom 5 is constituted of sections 5a, 5b, 5c, 5d, 5e, and 5f, in which the content (wt %) of bone calcium, i.e. $CaCO_3$, varies step-wise. The contents of $CaCO_3$ in the sections 5a, 5b, 5c, 5d, 5e, and 5f are already known.

Figure 1B:
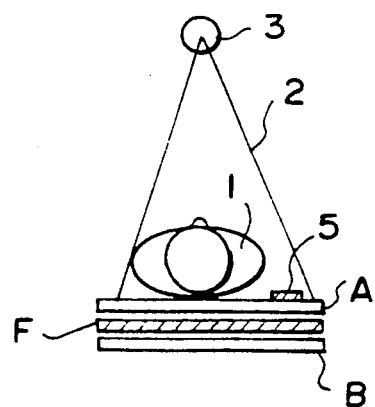
FIG. 1B is a side view showing a different example of how radiation images of an object and a bone calcium reference material are recorded in an embodiment of the first method for quantitatively analyzing bone calcium in accordance with the present invention.

Alternatively, an image recording operation may be carried out in the manner shown in FIG. 1B. With reference to FIG. 1B, stimulable phosphor sheets A and B are placed one upon the other, and a filter F capable of absorbing part of radiation energy is inserted between the stimulable phosphor sheets A and B. The stimulable phosphor sheets A and B are exposed to X-rays 2, which have passed through an object 1 and a phantom 5. In this manner, the stimulable phosphor sheets A and B are simultaneously exposed to the X-rays 2 having different energy levels. The image recording operation is thus carried out for one-shot energy subtraction processing. One of techniques for carrying out one-short energy subtraction processing is disclosed in, for example, U.S. Pat. No. 4,855,598.

In the manner described above, two X-ray images are stored on the stimulable phosphor sheets A and B. Thereafter, in an image read-out means shown in FIG. 3, the X-ray images are read out from the stimulable phosphor sheets A and B, and digital image signals representing the X-ray images are thereby obtained. Specifically, first, the stimulable phosphor sheet A is moved in the sub-scanning direction indicated by the arrow Y. At the same time, a laser beam 11, which serves as stimulating rays, is produced by a laser beam source 10. The laser beam 11 is deflected by a scanning mirror 12 and caused to scan the stimulable phosphor sheet A in the main scanning directions indicated by the double-headed arrow X. When the stimulable phosphor sheet A is exposed to the laser beam 11, it emits light 13 in proportion to the amount of energy stored thereon during its exposure to the X-rays 2. The emitted light 13 enters a light guide member 14, which is made from a transparent acrylic plate, from its one edge face. The emitted light 13 is guided through repeated total reflection inside of the light guide member 14 and detected by a photomultiplier 15. The photomultiplier 15 generates an image signal S corresponding to the amount of the emitted light 13, i.e. representing the X-ray image stored on the stimulable phosphor sheet A.

The image signal S is converted into a digital image signal logSA having logarithmic values (logS) by a logarithmic converter 16 provided with an amplifier and an A/D converter. The digital image signal logSA is stored on a storage medium 17, such as a magnetic disk. Thereafter, the X-ray image stored on the stimulable phosphor sheet B is read out in the same manner as that described above. The digital image signal logSB representing the X-ray image stored on the stimulable phosphor sheet B is stored on the storage medium 17.

Figure 1C:
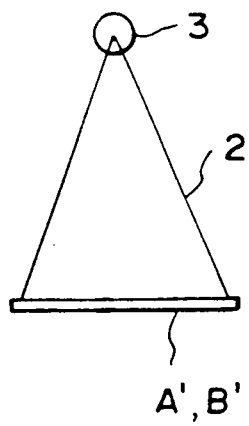
FIG. 1C is a side view showing a recording step for investigating nonuniformity in how radiation is irradiated to a stimulable phosphor sheet.

As shown in FIG. 1C, in cases where the X-ray images of the object 1 were sequentially stored on the stimulable phosphor sheets A and B by changing the tube voltage of the X-ray source 3 as shown in FIG. 1A, stimulable phosphor sheets A' and B' are sequentially exposed to the X-rays 2, which are produced by changing the tube voltage of the X-ray source 3 in the same manner as that when the X-ray images of the object 1 were recorded as shown in FIG. 1A. At this time, no object is placed between the X-ray source 3 and each stimulable phosphor sheet. In this manner, in order for nonuniformity in how the X-rays 2 are irradiated to the stimulable phosphor sheets A' and B' to be investigated, energy from the X-rays 2, which are produced by changing the tube voltage of the X-ray source 3, is stored on the stimulable phosphor sheets A' and B'.

In cases where the X-ray images of the object 1 were simultaneously stored on the stimulable phosphor sheets A and B as shown in FIG. 1B, stimulable phosphor sheets A' and B' are superposed one upon the other with the filter F intervening therebetween and are simultaneously exposed to the X-rays 2 in the same manner as that when the X-ray images of the object 1 were recorded as shown in FIG. 1B. At this time, no object is placed between the X-ray source 3 and the stimulable phosphor sheets A' and B'. In this manner, in order for nonuniformity in how the X-rays 2 are irradiated to the stimulable phosphor sheets A' and B' to be investigated, energy from the X-rays 2 is stored on the stimulable phosphor sheets A' and B'.

Images stored on the stimulable phosphor sheets A' and B' are read out by the image read-out means shown in FIG. 3, and digital image signals are thereby obtained which represent nonuniformity in how the X-rays 2 are irradiated to the stimulable phosphor sheets A' and B'.

The recording steps described above are shown in FIGS. 4A through 4D, and the X-ray images recorded with the recording steps are shown in FIGS. 5A through 5D.

As shown in FIGS. 4A through 4D and FIGS. 5A through 5D, a digital image signal logSa represents the X-ray image, which indicates the nonuniformity in how the X-rays 2 produced at a high tube voltage (120kV) are irradiated to the stimulable phosphor sheet A' without an object intervening between the X-ray source 3 and the stimulable phosphor sheet A'. A digital image signal logSb represents the X-ray image, which indicates the nonuniformity in how the X-rays 2 produced at a low tube voltage (60 kV) are irradiated to the stimulable phosphor sheet B' without an object intervening between the X-ray source 3 and the stimulable phosphor sheet B'. A digital image signal logSA represents the X-ray image of the object 1 and the phantom 5, which image has been stored on the stimulable phosphor sheet A at the high tube voltage. A digital image signal logSB represents the X-ray image of the object 1 and the phantom 5, which image has been stored on the stimulable phosphor sheet B at the low tube voltage.

The digital image signals logSa and logSb, which represent the nonuniformity in how the X-rays 2 are irradiated to the stimulable phosphor sheets A' and B', are smoothed with a mask size of 1 cm×1 cm. In this manner, image signals logSa' and log Sb', which are now free of noise, are obtained and stored in the storage medium 17.

The digital image signal logSA and the X-ray irradiation nonuniformity signal logSa' are then subtracted from each other, and a digital image signal logSA' ($=$logSA$-$logSa') is thereby obtained which has been compensated for nonuniformity in how the X-rays 2 produced at the high tube voltage are irradiated to the stimulable phosphor sheet. Also, the digital image signal logSB and the X-ray irradiation nonuniformity signal logSb' are subtracted from each other, and a digital image signal logSB' ($=$logSB$-$logSb') is thereby obtained which has been compensated for nonuniformity in how the X-rays 2 produced at the low tube voltage are irradiated to the stimulable phosphor sheet.

Figure 6:
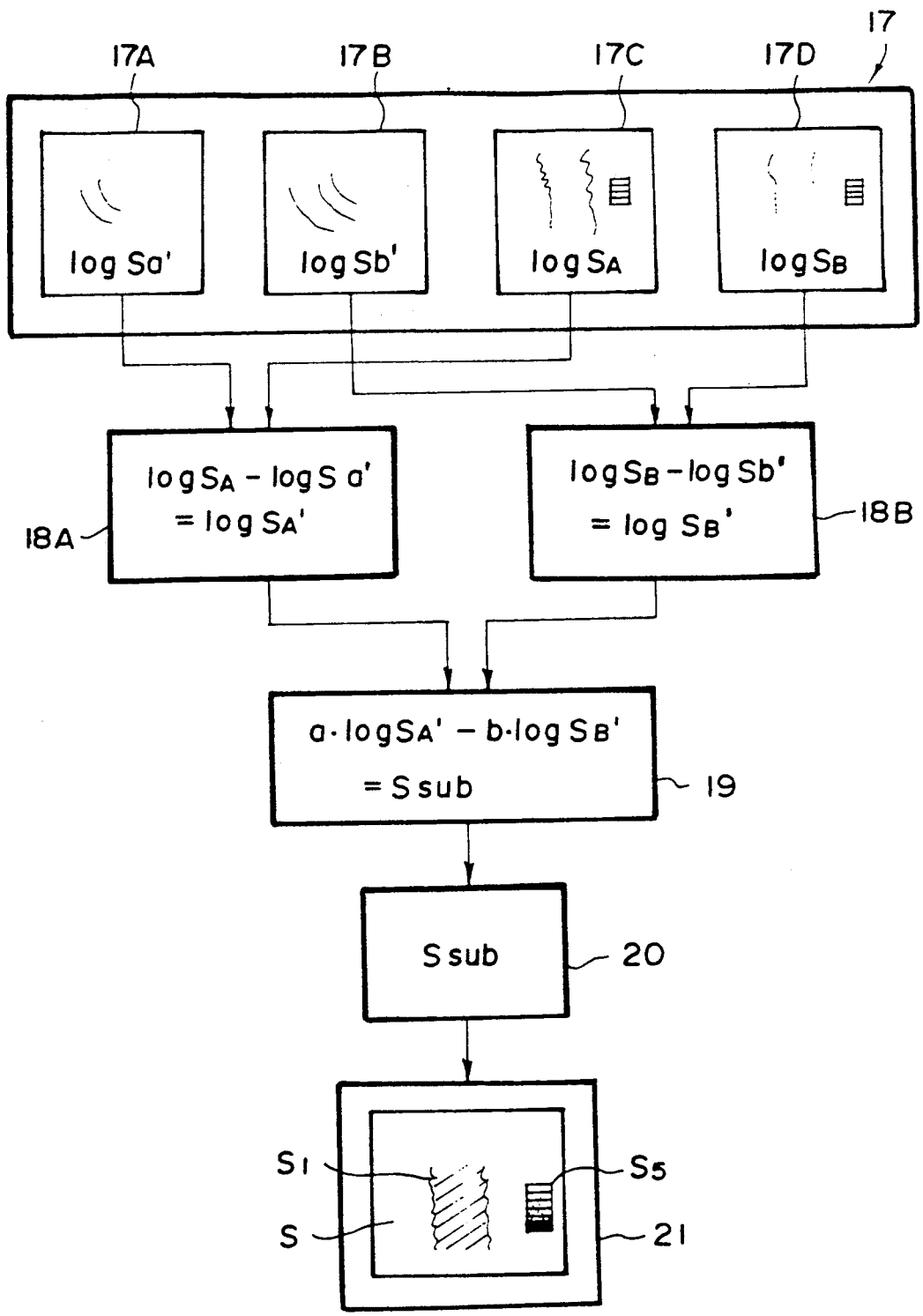
FIG. 6 is a block diagram showing how image signals are processed in the first method for quantitatively analyzing bone calcium in accordance with the present invention.

Thereafter a subtraction process is carried out on the digital image signals logSA' and logSB', which have been obtained in the manner described above. FIG. 6 is a block diagram showing how image signals are processed in the first method for quantitatively analyzing bone calcium in accordance with the present invention. First, the digital image signal logSa, which represents nonuniformity in how the X-rays having a high energy level are irradiated to the stimulable phosphor sheet, is read from an image file 17A in the storage medium 17. Also, the digital image signal logSA representing the X-ray image recorded with the X-rays 2 having a high energy level is read from an image file 17C. The digital image signals logSa and logSA are fed into an X-ray irradiation nonuniformity compensating circuit 18A. At this time, the image signal logSa' is obtained by eliminating noise from the image signal logSa, and a calculation is then made with the formula logSA$-$logSa'. In this manner, a digital image signal logSA' is obtained. Thereafter, the digital image signal logSb, which represents nonuniformity in how the X-rays having a low energy level are irradiated to the stimulable phosphor sheet, is read from an image file 17B in the storage medium 17. Also, the digital image signal logSB representing the X-ray image recorded with the X-rays 2 having a low energy level is read from an image file 17D. The digital image signals logSb and logSB are fed into an X-ray irradiation nonuniformity compensating circuit 18B. At this time, the image signal logSb' is obtained by eliminating noise from the image signal logSb, and a calculation is then made with the formula logSB$-$logSb'. In this manner, a digital image signal logSB' is obtained.

The digital image signals logSA' and logSB', which have been obtained in the manner described above, are fed into a subtraction operating circuit 19. The subtraction operating circuit 19 appropriately weights the digital image signals logSA' and logSB'. Thereafter, the subtraction operating circuit 19 subtracts the image signal components of the digital image signals logSA' and logSB' from each other which represent corresponding picture elements in the two X-ray images. From the subtraction process, a digital difference signal is obtained, which is expressed as $$Ssub = a \cdot logSA' - b \cdot logSB' + c$$

wherein a and b denote weighting coefficients, and c denotes a bias component for adjusting such that the image density represented by the difference signal Ssub becomes approximately equal to a predetermined level. The difference signal Ssub is stored in an image file 20 and is then fed into a display device 21, which reproduces and displays a subtraction image S.

The subtraction image S thus displayed is composed of a pattern S1 of a bone of the object 1 and a pattern S5 of the phantom 5. Therefore, the pattern S1 of the bone of the object 1 and the pattern S5 of the phantom 5 can be observed simultaneously. One of the step-like sections in the pattern S5 of the phantom 5 is found, which has an image density equal or close to the image density of a specific part of the pattern S1 of the bone, which part is to be analyzed for the determination of the amount of bone calcium. Thereafter, the amount of bone calcium can be determined which corresponds to the image density.

For this purpose, as shown in FIG. 7, a calibration curve 24 is prepared which indicates the relationship between the amounts of $CaCO_3$ in the sections 5a, 5b, 5c, 5d, 5e, and 5f of the phantom 5 and the image densities of these sections in the subtraction image S1. From the calibration curve 24, the true value (the amount of bone calcium) can be found which corresponds to the measured value (the image density). For example, in cases where the image density of the specific part of the pattern S1 of the bone in the subtraction image S1 is equal to an intermediate value d1 between the image densities Pb and Pc of two adjacent sections in the pattern S5 of the phantom 5, the true value V1 corresponding to the image density d1 on the calibration curve 24 is determined as the amount of bone calcium.

The amount of bone calcium, which has been determined in the manner described above, may be displayed or recorded by one of various known display devices or recording apparatuses. For this purpose, information representing the amount of bone calcium found from the calibration curve 24 may be entered manually into the display device or the recording apparatus. Alternatively, the information representing the calibration curve may be stored in a table memory, and a position in the bone image may be designated on the display device 21. The image density at the designated position may then be converted into the amount of bone calcium in accordance with the calibration curve, and may thus be automatically displayed or recorded.

In the embodiment described above, a change in the adverse effects of scattered radiation due to the thickness of the object, i.e. the body thickness of the patient, is not taken into consideration. However, in order for a more accurate quantitative analysis to be carried out, the adverse effects of scattered radiation due to the thickness of the object should preferably be predicted and compensated for.

Figure 8:
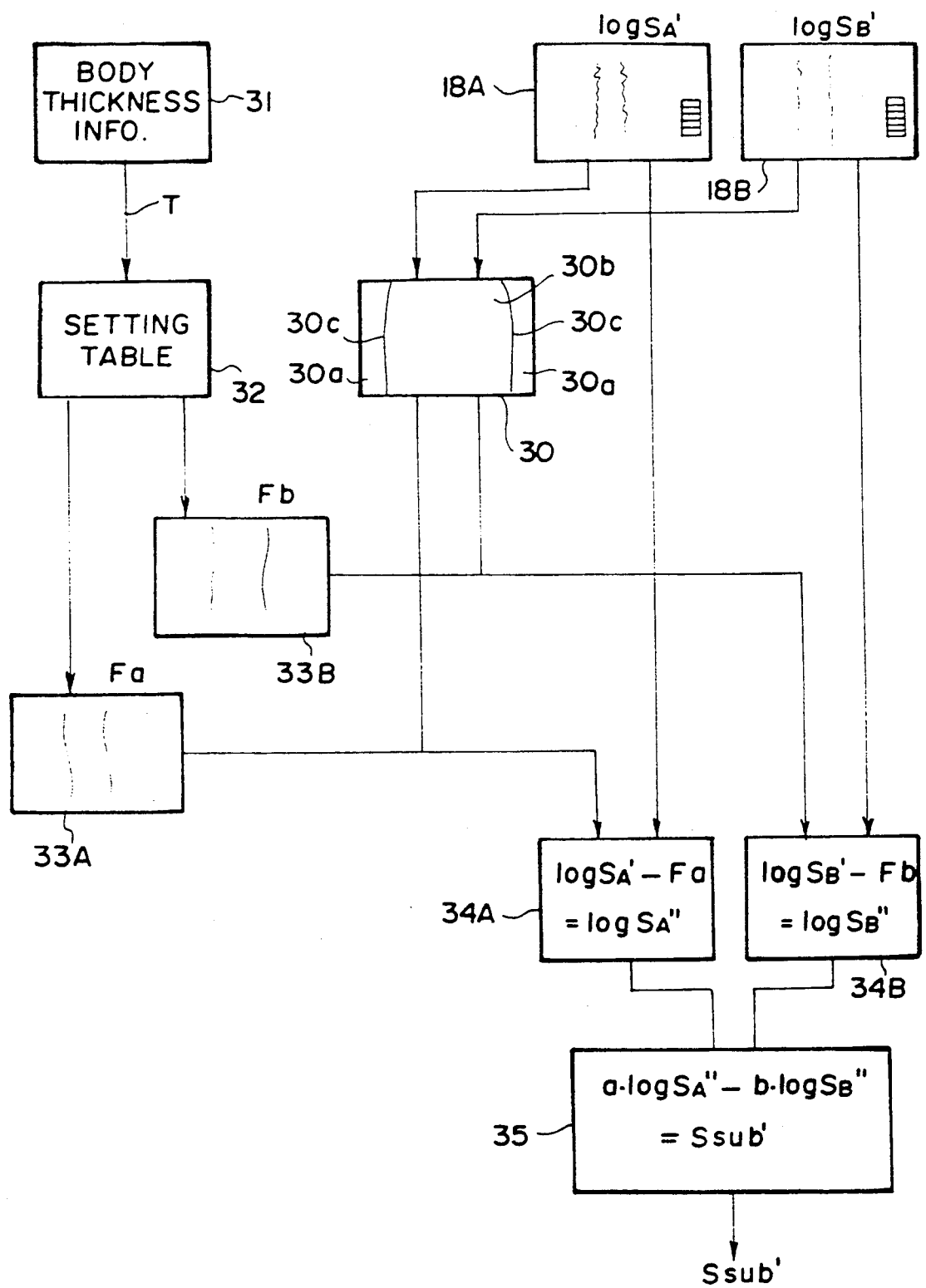
FIG. 8 is a block diagram showing how adverse effects of scattered radiation are predicted and eliminated in an embodiment of the second method for quantitatively analyzing bone calcium in accordance with the present invention.

FIG. 8 is a block diagram showing how adverse effects of scattered radiation are predicted and eliminated in an embodiment of the second method for quantitatively analyzing bone calcium in accordance with the present invention.

With reference to FIG. 8, from the digital image signals logSA' and logSB', which have been compensated for X-ray irradiation nonuniformity and stored in the images files 18A and 18B in the manner described above, a boundary detecting circuit 30 detects boundaries 30c, 30c between a background region 30a and a body region 30b. Also, information representing the body thickness T ($\times$cm) of the patient is entered from a patient information entering device 31. The information representing the body thickness T of the patient is fed into a setting table memory 32, which stores information representing the relationship between the body thickness and an image representing predicted effects of scattered radiation for each tube voltage of the X-ray source. In this manner, images representing predicted effects of scattered radiation for different tube voltages of the X-ray source are found, and signals Fa and Fb representing these images are stored in files 33A and 33B. The signals Fa and Fb representing the images are then compensated for shift in accordance with the information fed out of the boundary detecting circuit 30. Thereafter, the signals Fa and Fb are subtracted from the digital image signals logSA' and logSB', which have been compensated for X-ray irradiation nonuniformity and stored in the images files 18A and 18B. In this manner, digital image signals logSA" and logSB" are obtained, which have been corrected with the scattered radiation predicting signals. The digital image signals logSA" and logSB" are stored in files 34A and 34B. In an operation circuit 35, a subtraction process is carried out on the digital image signals logSA" and logSB", and an energy subtraction image signal Ssub' is thereby obtained.

In the manner described above, the image signal Ssub' is obtained, which has been compensated for X-ray irradiation nonuniformity and effects of scattered radiation due to the body thickness. In the same manner as that described above with reference to FIG. 6, a visible image can be reproduced from the image signal Ssub' and displayed on the display device 21. From the visible image, the amount of bone calcium can be determined quantitatively in the same manner as that in the aforesaid embodiment.

Embodiments of the third and fourth methods for quantitatively analyzing bone calcium in accordance with the present invention will be described hereinbelow. In these embodiments, stimulable phosphor sheets are used.

First, an embodiment of the third method for quantitatively analyzing bone calcium in accordance with the present invention will be described hereinbelow.

Figure 9A:
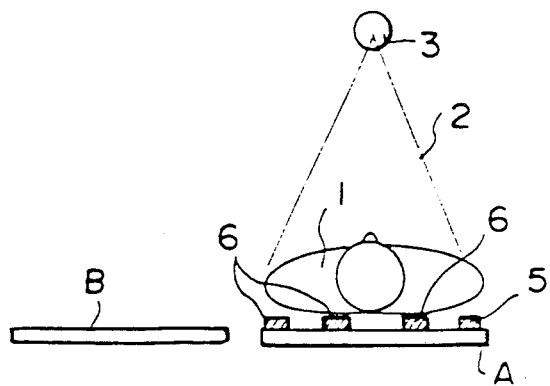
FIGS. 9A and 9B are side views showing examples of image recording steps in an embodiment of the third method for quantitatively analyzing bone calcium in accordance with the present invention.

With reference to FIG. 9A, stimulable phosphor sheets A and B are sequentially exposed to X-rays 2, which have passed through an object 1 constituted of bones and soft tissues and which have different energy levels. Specifically, first, an X-ray image of the object 1 is stored on the stimulable phosphor sheet A. Thereafter, the stimulable phosphor sheet A is quickly removed from the position for exposure to the X-rays 2, and the stimulable phosphor sheet B is quickly set at the position for exposure to the X-rays 2. At the same time, the tube voltage of the X-ray source 3 is changed so that it produces the X-rays 2 having a different energy level. In this manner, an X-ray image of the object 1 is stored on the stimulable phosphor sheet B with the X-rays 2 having the different energy level. The positions of the stimulable phosphor sheets A and B with respect to the position of the object 1 are kept the same.

At this time, a bone calcium reference material (a phantom) 5 as shown in FIG. 2, which is constituted of a plurality of sections the radiation absorption amounts of which are known and vary step-wise, is placed on each of the stimulable phosphor sheets A and B. In this manner, a pattern of the phantom 5 and the pattern of the object 1 are stored together on each of the stimulable phosphor sheets A and B. Also, a plurality of bone calcium blocks 6, 6, . . . , which are constituted of only one of the sections of the phantom 5, are spaced away from one another, and patterns of the bone calcium blocks 6, 6, . . . are also stored on the stimulable phosphor sheets A and B.

Figure 9B:
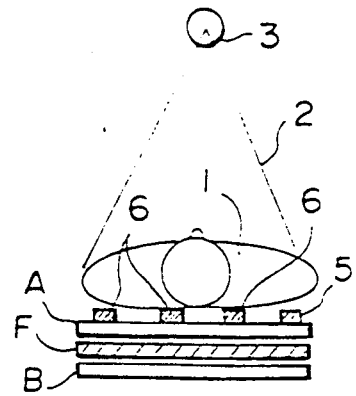

Alternatively, an image recording operation may be carried out in the manner shown in FIG. 9B. With reference to FIG. 9B, stimulable phosphor sheets A and B are placed one upon the other, and a filter F capable of absorbing part of radiation energy is inserted between the stimulable phosphor sheets A and B. The stimulable phosphor sheets A and B are exposed to X-rays 2, which have passed through an object 1 and a phantom 5. In this manner, the stimulable phosphor sheets A and B are simultaneously exposed to the X-rays 2 having different energy levels. The image recording operation is thus carried out for one-shot energy subtraction processing.

In the manner described above, two X-ray images are stored on the stimulable phosphor sheets A and B. Thereafter, in the image read-out means shown in FIG. 3, the X-ray images are read out from the stimulable phosphor sheets A and B in the same manner as that described above, and digital image signals logSA and logSB representing the X-ray images are thereby obtained and stored on the storage medium 17.

Figure 10:
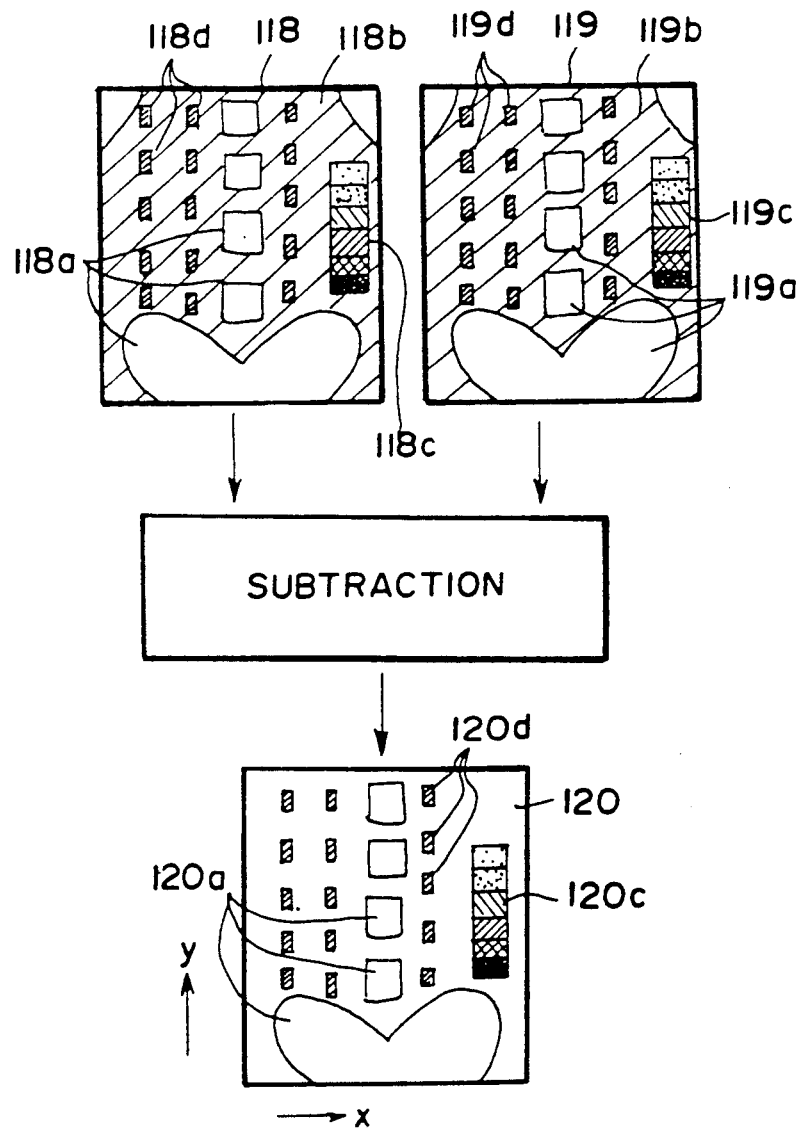
FIG. 10 is an explanatory view showing how energy subtraction processing is carried out in the embodiment of the third method for quantitatively analyzing bone calcium in accordance with the present invention.

FIG. 10 shows how a subtraction process is carried out on the digital image signls logSA and logSB, which have been obtained in the manner described above. An image 118 is represented by the digital image signal logSA and was stored with the X-rays 2 produced at a low tube voltage (e.g. 60 kV) of the X-ray source 3. An image 119 was stored with the X-rays 2 produced at a high tube voltage (120 kV) of the X-ray source 3. The image 118 is composed of patterns 118a, 118a, . . . of the bones of the lumbar of a human body, a pattern 118b of the soft tissues, a pattern 118c of the bone calcium reference material, and patterns 118d, 118d, . . . of the bone calcium blocks. Also, the image 119 is composed of patterns 119a, 119a, . . . of the bones of the lumbar of a human body, a pattern 119b of the soft tissues, a pattern 119c of the bone calcium reference material, and patterns 119d, 119d, . . . of the bone calcium blocks.

The thickness, or the like, of the soft tissues varies markedly for different persons, and the corresponding patterns adversely affect the quantitative determination of the amount of bone calcium. Therefore, the image signal components of the digital image signals logSA and logSB are subtracted from each other which represent corresponding picture elements in the X-ray images 118 and 119. From the subtraction process, a bone image signal is obtained, which is expressed as $$logS = AlogSA - BlogSB + C \quad (1)$$

wherein A, B and C denote coefficients. The bone image signal represents a bone image 120, in which the patterns 118b, 119b of the soft tissues have been erased.

FIG. 11 shows a calibration curve (a calibration curved surface) for image density, which has been formed from the image density (i.e. the value of the image signal logS) of the patterns 120d, 120d, . . . of the bone calcium blocks in the bone image 120 shown in FIG. 10. If there were no adverse effects of the scattered radiation, or the like, a flat plane would be obtained which are parallel to the x-y plane. However, because of the adverse effects of the scattered radiation, or the like, the calibration curve (the calibration curved surface) is obtained.

FIG. 12 shows a straight line, which represents the relationship between the image density and the amount of bone calcium and which has been formed from the image densities of the sections of the pattern 120c of the bone calcium reference material, which pattern appears in the bone image 120.

A straight line 124 has been obtained from the image densities of the sections of the pattern 120c of the bone calcium reference material. When the image density of the pattern of a bone is d1, the amount of bone calcium in the bone is found to te V1. However, the amount of bone calcium V1 includes an error due to the scattered radiation, or the like. Therefore, in this embodiment, the image density of the pattern of the bone is corrected in accordance with the calibration curve (the calibration curved surface) shown in FIG. 11, which is used for compensating the image density for a difference in the position between the pattern of the bone calcium reference material and the pattern of the bone in the image. An amount of bone calcium V2 is found which corresponds to the corrected image density d2. In this manner, an error due to adverse effects of the scattered radiation, or the like, is eliminated, and the amount of bone calcium can be determined accurately. Instead of the image density being corrected, an image density - bone calcium amount calibration line 124' may be formed, which has been corrected in accordance with the calibration curve (the calibration curved surface). The amount of bone calcium may then be determined from the calibration line 124'.

An embodiment of the fourth method for quantitatively analyzing bone calcium in accordance with the present invention will be described hereinbelow.

Figure 13A:
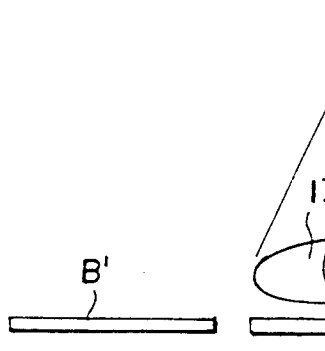
FIGS. 13A and 13B are side views showing examples of image recording steps in an embodiment of the fourth method for quantitatively analyzing bone calcium in accordance with the present invention.
Figure 13B:
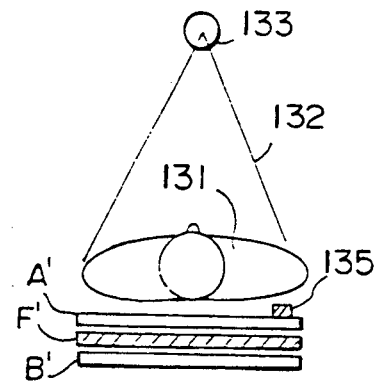

With reference to FIG. 13A, stimulable phosphor sheets A' and B' are sequentially exposed to X-rays 132, which have passed through an object 131 constituted of bones and soft tissues and a bone calcium reference material (a phantom) 135 and which have different energy levels. Alternatively, an image recording operation may be carried out in the manner shown in FIG. 13B. With reference to FIG. 13B, stimulable phosphor sheets A' and B' are placed one upon the other, and a filter F' capable of absorbing part of radiation energy is inserted between the stimulable phosphor sheets A' and B'. The stimulable phosphor sheets A' and B' are exposed to X-ray 132, which have passed through an object 131 and a phantom 135. In this manner, the stimulable phosphor sheet A' and B' are simultaneously exposed to the X-rays 132 having different energy levels. The image recording operation is thus carried out for one-shot energy subtraction processing.

In the manner described above with reference to FIG. 13A or FIG. 13B, two X-ray images are stored on the stimulable phosphor sheets A' and B'. Thereafter, in the image read-out means shown in FIG. 3, the X-ray images are read out from the stimulable phosphor sheets A' and B' in the same manner as that described above, and digital image signals logS'A and logS'B representing the X-ray images are thereby obtained and stored on the storage medium 17.

Figure 14:
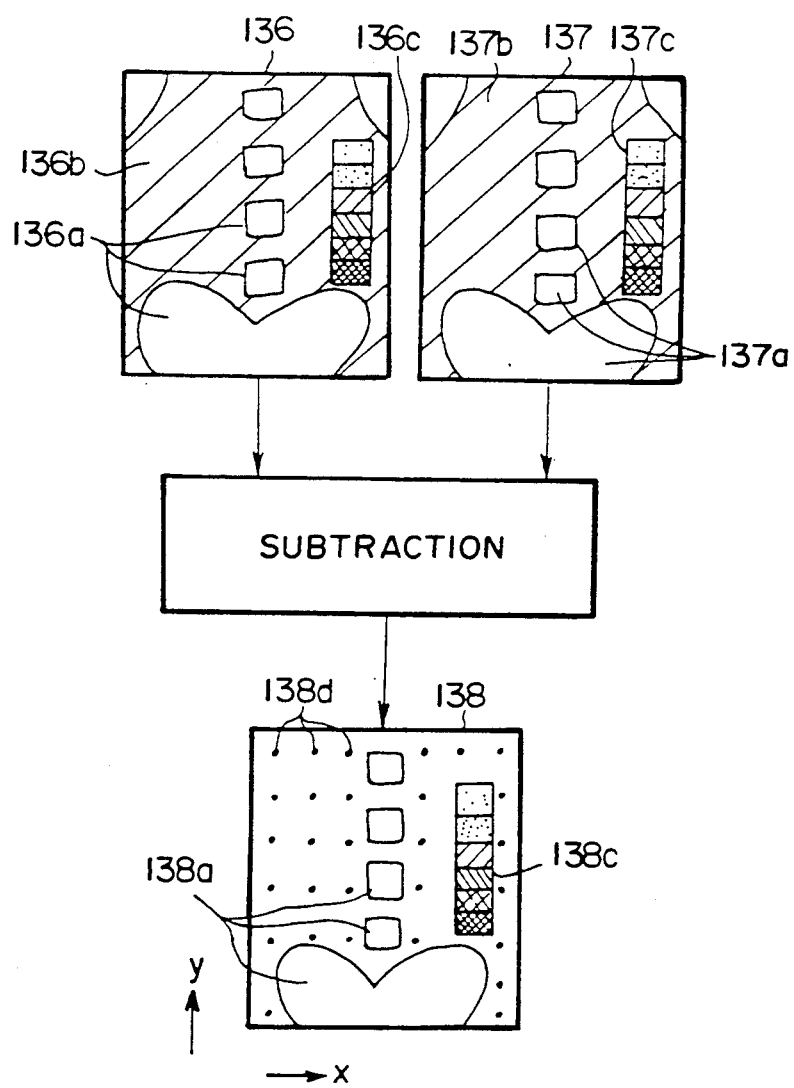
FIG. 14 is an explanatory view showing how energy subtraction processing is carried out in the embodiment of the fourth method for quantitatively analyzing bone calcium in accordance with the present invention.

FIG. 14 shows how a subtraction process is carried out on the digital image signals logS'A and logS'B, which have been obtained in the manner described above. An image 136 is represented by the digital image signal logS'A and was stored with the X-rays 132 produced at a low tube voltage (e.g. 60kV) of the X-ray source 133. An image 137 was stored with the X-rays 132 produced at a high tube voltage (120kV) of the X-ray source 133. The image 137 is composed of patterns 136a, 136a, . . . of the bones of the lumbar of a human body, a pattern 136b of the soft tissues, and a pattern 136c of the bone calcium reference material. Also, the image 137 is composed of patterns 137a, 137a, . . . of the bones of the lumbar of a human body, a pattern 137b of the soft tissues, and a pattern 137c of the bone calcium reference material.

The thickness, or the like, of the soft tissues varies markedly for different persons, and the corresponding patterns adversely affect the quantitative determination of the amount of bone calcium. Therefore, the image signal components of the digital image signals logS'A and logS'B are subtracted from each other which represent corresponding picture elements in the X-ray images 136 and 137. From the subtraction process, a bone image signal is obtained, which is expressed as $$logS' = AlogS'A - BlogS'B + C \qquad (2)$$

wherein A, B and C denote coefficients. The bone image signal represents a bone image 138, in which the patterns 136b, 137b of the soft tissues have been erased.

Thereafter, background signal components are detected, which represent picture elements 138d, 138d, . . . in a background region other than the patterns 138a, 138a, . . . of the bones and the pattern 138c of the bone calcium reference material in the bone image 138. From the background signal components, which have thus been detected, background signal components are predicted, which are superposed upon the image signal components representing the patterns 138a, 138a, . . . of the bones and the pattern 138c of the bone calcium reference material. A calibration curve (a calibration curved surface) for the image density is formed from the background signal components, which have thus been predicted.

Figure 15:
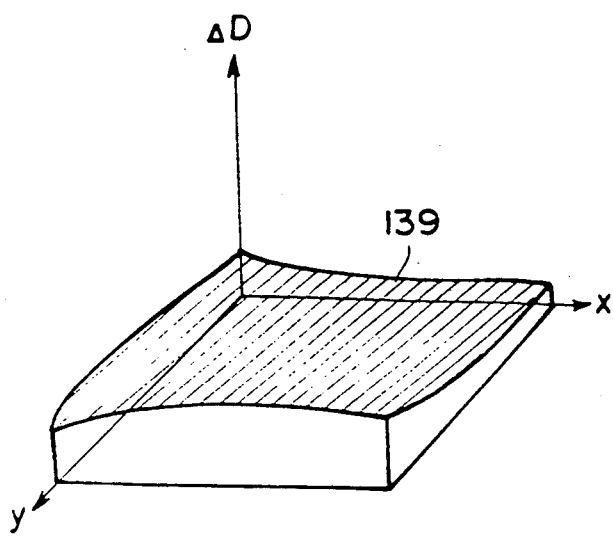
FIG. 15 is a graph showing a calibration curve (a calibration curved surface) for image density, which curve is obtained in the embodiment of the fourth method for quantitatively analyzing bone calcium in accordance with the present invention.

FIG. 15 shows the calibration curve (the calibration curved surface) for image density, which has been formed from the background signal components obtained from the bone image 138. If there were no adverse effects of the scattered radiation, or the like, a flat plane would be obtained which are parallel to the x-y plane. However, because of the adverse effects of the scattered radiation, or the like, the calibration curve (the calibration curved surface) is obtained.

Figure 16:
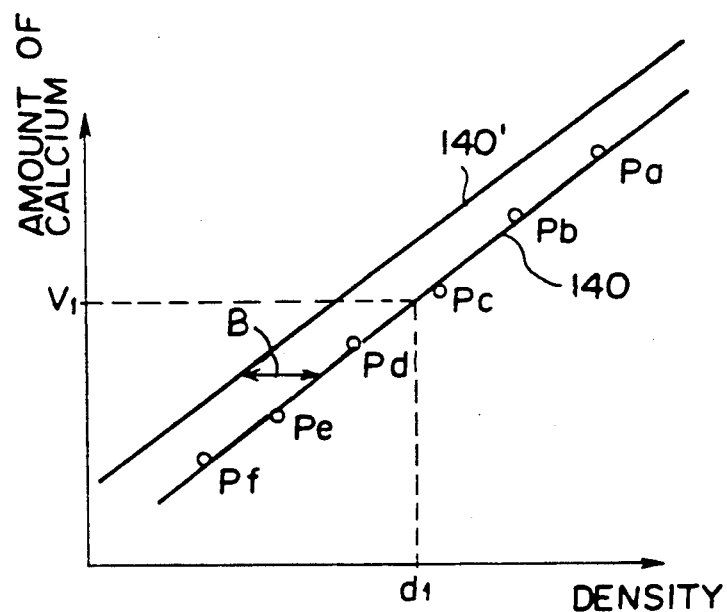
FIG. 16 is a graph showing a curve indicating the relationship between the amount of bone calcium and the image density, which curve is obtained in the embodiment of the fourth method for quantitatively analyzing bone calcium in accordance with the present invention.

FIG. 16 shows a straight line, which represents the relationship between the image density and the amount of bone calcium and which has been formed from the image densities of the sections of the pattern 138c of the bone calcium reference material, which pattern appears in the bone image 138.

A straight line 140 has been obtained from the image densities of the sections of the pattern 138c of the bone calcium reference material. When the image density of the pattern of a bone is d1, the amount of bone calcium in the bone is found to be V1. However, the amount of bone calcium V1 includes an error due to the scattered radiation, or the like. Therefore, in this embodiment, the image density of the pattern of the bone is corrected in accordance with the calibration curve (the calibration curved surface) shown in FIG. 15, which has been obtained from the background signal components and is used for compensating the image density for a difference in the position between the pattern of the bone calcium reference material and the pattern of the bone in the image. An amount of bone calcium V2 is found which corresponds to the corrected image density d2. In this manner, an error due to adverse effects of the scattered radiation, or the like, is eliminated, and the amount of bone calcium can be determined accurately. Instead of the image density being corrected, an image density - bone calcium amount calibration line 140' may be formed, which has been corrected in accordance with the calibration curve (the calibration curved surface). The amount of bone calcium may then be determined from the calibration line 140'.

In the aforesaid embodiments of the third and fourth methods for quantitatively analyzing bone calcium in accordance with the present invention, the stimulable phosphor sheets are used. The third and fourth methods for quantitatively analyzing bone calcium in accordance with the present invention are also applicable when other recording media, such as X-ray film, are used. Also, the calibration lines 124, 124', 140, and 140' in the embodiments of the third and fourth methods for quantitatively analyzing bone calcium in accordance with the present invention are approximated by straight lines, they may be curves.

An embodiment of the fifth method for quantitatively analyzing bone calcium in accordance with the present invention will be described hereinbelow. In this embodiment, stimulable phosphor sheets are used.

Figure 17A:
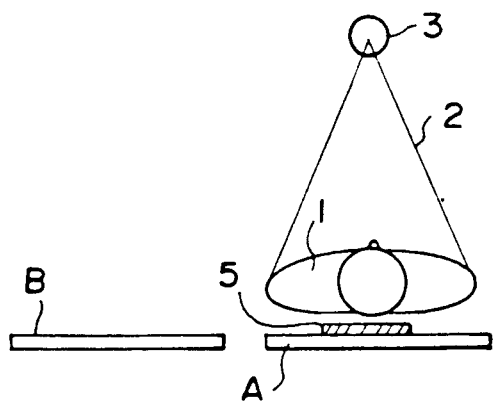
FIGS. 17A and 17B are side views showing examples of image recording steps in an embodiment of the fifth method for quantitatively analyzing bone calcium in accordance with the present invention.

With reference to FIG. 17A, stimulable phosphor sheets A and B are sequentially exposed to X-rays 2, which have passed through an object 1 constituted of bones and soft tissues and which have different energy levels. Specifically, first, an X-ray image of the object 1 is stored on the stimulable phosphor sheet A. Thereafter, the stimulable phosphor sheet A is quickly removed from the position for exposure to the X-rays 2, and the stimulable phosphor sheet B is quickly set at the position for exposure to the X-rays 2. At the same time, the tube voltage of the X-ray source 3 is changed so that it produces the X-rays 2 having a different energy level. In this manner, an X-ray image of the object 1 is stored on the stimulable phosphor sheet B with the X-rays 2 having the different energy level. The positions of the stimulable phosphor sheets A and B with respect to the position of the object 1 are kept the same.

At this time, a bone calcium reference material (a phantom) 5 as shown in FIG. 2, which is constituted of a plurality of sections the radiation absorption amounts of which are known and vary step-wise, is placed on each of the stimulable phosphor sheets A and B such that the phantom 5 overlaps a specific part of the bones of the object 1. In this manner, a pattern of the phantom 5 and the pattern of the object 1 are stored together on each of the stimulable phosphor sheets A and B. The phantom 5 is comparatively wide so that, when its pattern and the pattern of the specific part of the bones of the object 1 are superposed one upon the other and recorded, part of the pattern of the phantom 5 may project outwardly from the pattern of the specific part of the bones.

Figure 17B:
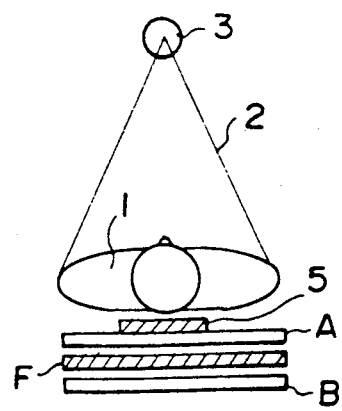

Alternatively, an image recording operation may be carried out in the manner shown in FIG. 17B. With reference to FIG. 17B, stimulable phosphor sheets A and B are placed one upon the other, and a filter F capable of absorbing part of radiation energy is inserted between the stimulable phosphor sheets A and B. The stimulable phosphor sheets A and B are exposed to X-rays 2, which have passed through an object 1 and a phantom 5. In this manner, the stimulable phosphor sheets A and B are simultaneously exposed to the X-rays 2 having different energy levels. The image recording operation is thus carried out for one-shot energy subtraction processing.

In the manner described above with reference to FIG. 17A or FIG. 17B, two X-ray images are stored on the stimulable phosphor sheets A and 8. Thereafter, in the image read-out means shown in FIG. 3, the X-ray images are read out from the stimulable phosphor sheets A and B in the same manner as that described above, and digital image signals logSA and logSB representing the X-ray images are thereby obtained and stored on the storage medium 17.

Figure 18:
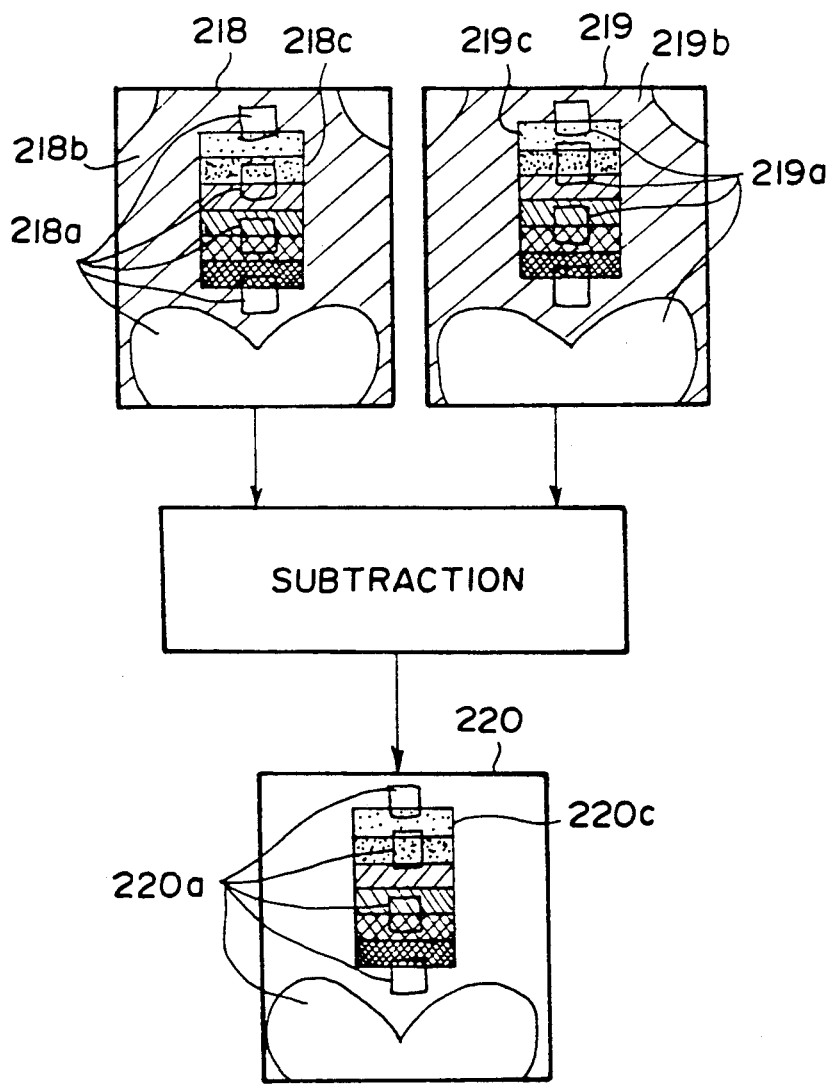
FIG. 18 is an explanatory view showing how energy subtraction processing is carried out in the embodiment of the fifth method for quantitatively analyzing bone calcium in accordance with the present invention.

FIG. 18 shows how a subtraction process is carried out on the digital image signals logSA and logSB, which have been obtained in the manner described above.

An image 218 is represented by the digital image signal logSA and was stored with the X-rays 2 produced at a low tube voltage (e.g. 60 kV) of the X-ray source 3. An image 219 is represented by the digital image signal logSB and was stored with the X-rays 2 produced at a high tube voltage (120 kV) of the X-ray source 3. The image 218 is composed of patterns 218a, 218a, ... of the bones of the lumbar of a human body, a pattern 218b of the soft tissues, and a pattern 218c of the bone calcium reference material. Also, the image 219 is composed of patterns 219a, 219a, ... of the bones of the lumbar of a human body, a pattern 219b of the soft tissues, and a pattern 219c of the bone calcium reference material. Each of the patterns 218c and 219c of the bone calcium reference material is superposed upon the pattern of the specific part of the bones. Also, both sides of each of the patterns 218c and 219c of the bone calcium reference material project outwardly from the patterns 218a, 218a, ... and the patterns 219a, 219a, ... of the bones.

The thickness, or the like, of the soft tissues varies markedly for different persons, and the corresponding patterns adversely affect the quantitative determination of the amount of bone calcium. Therefore, the image signal components of the digital image signals logSA and logSB are subtracted from each other which represent corresponding picture elements in the X-ray images 218 and 219. From the subtraction process, a bone image signal is obtained, which is expressed as $$\log S = A \log SA - B \log SB + C \quad (3)$$

wherein A, B and C denote coefficient. The bone image signal represents a bone image 220, in which the patterns 218b, 219b of the soft tissues have been erased and only the patterns 220a, 220a, ... of the bones and the pattern 220c of the bone calcium reference material are formed. From the bone image 220, the image density of the pattern of the specific part of the bones and the image density of the pattern of the bone calcium reference material are found. In cases where the pattern of part of the bones overlaps upon the pattern of the bone calcium reference material and the image density of the pattern of the part of the bones cannot be directly found, a difference between the image density of the overlapping part and the image density of part of the pattern 220c of the bone calcium reference material other than the overlapping part may be calculated, and the image density of the patterns 220a, 220a, ... of the bones may thus be found.

Alternatively, the image density may be converted into the amount of bone calcium. Thereafter, the amount of bone calcium in the bone calcium reference material may be subtracted from the amount of bone calcium, which has been obtained from the conversion, and the difference thus calculated may be taken as the amount of bone calcium in the bones.

Figure 19:
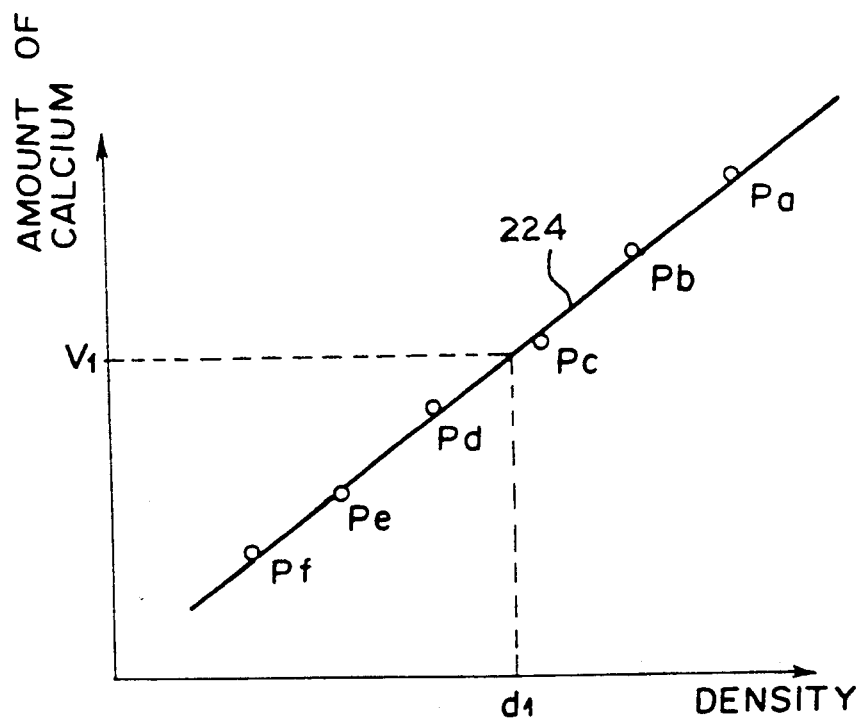
FIG. 19 is a graph showing a curve indicating the relationship between the amount of bone calcium and the image density, which curve is obtained in the embodiment of the fifth method for quantitatively analyzing bone calcium in accordance with the present invention.

FIG. 19 shows a straight line, which represents the relationship between the image density and the amount of bone calcium and which has been obtained from the image density of part of the pattern 220c of the bone calcium reference material, which part projects outwardly from the patterns 220a, 220a, ... of the bones in the bone image 220.

From the straight line 224, when the image density of the pattern 220a of the specific part of the bones in the bone image 220 is d1, the amount of bone calcium in the specific part is found to be V1.

In the embodiment of the fifth method for quantitatively analyzing bone calcium in accordance with the present invention, the stimulable phosphor sheets. Alternatively, other recording media, such as X-ray film, may be used.

An embodiment of the sixth method for quantitatively analyzing bone calcium in accordance with the present invention will be described hereinbelow. In this embodiment, stimulable phosphor sheets are used.

Figures 20A, 20B:
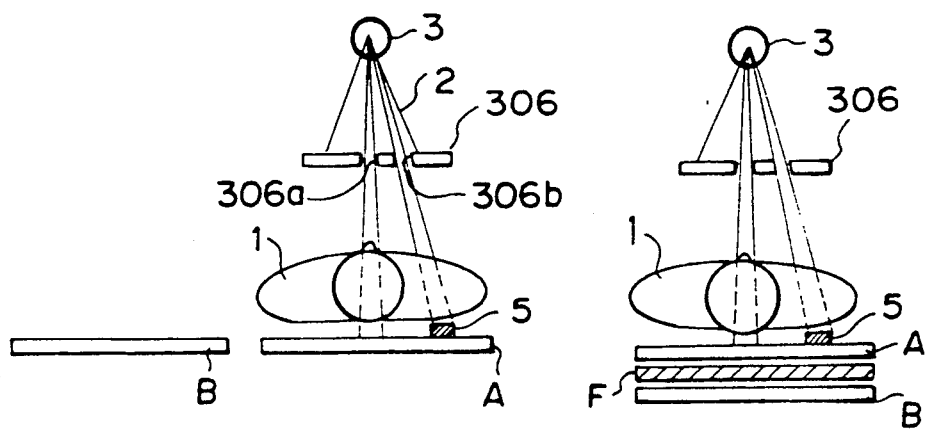
FIGS. 20A and 20B are side views showing examples of image recording steps in an embodiment of the sixth method for quantitatively analyzing bone calcium in accordance with the present invention.

With reference to FIG. 20A, stimulable phosphor sheets A and B are sequentially exposed to X-rays 2, which have passed through an object 1 constituted of bones and soft tissues and which have different energy levels. Specifically, first, an X-ray image of the object 1 is stored on the stimulable phosphor sheet A. Thereafter, the stimulable phosphor sheet A is quickly removed from the position for exposure to the X-rays 2, and the stimulable phosphor sheet B is quickly set at the position for exposure to the X-rays 2. At the same time, the tube voltage of the X-ray source 3 is changed so that it produces the X-rays 2 having a different energy level. In this manner, an X-ray image of the object 1 is stored on the stimulable phosphor sheet B with the X-rays 2 having the different energy level. The positions of the stimulable phosphor sheets A and B with respect to the position of the object 1 are kept the same.

At this time, a bone calcium reference material (a phantom) 5 as shown in FIG. 2, which is constituted of a plurality of sections the radiation absorption amounts of which are known and vary step-wise, is placed on each of the stimulable phosphor sheets A and B. In this manner, a pattern of the phantom 5 and the pattern of the object 1 are stored together on each of the stimulable phosphor sheets A and B. Also, as shown in FIG. 20A, when the X-ray images are recorded, a lead plate 306 is used. The lead plate 306 has a window 306a, through which the X-rays 2 pass and impinge upon a specific part of the bones of the human body, and a window 306b, through which the X-rays 2 pass and impinge upon the bone calcium reference material 5. The lead plate 306 blocks the X-rays 2 so that the X-rays 2 do not impinge upon areas other than the specific part of the bones and the bone calcium reference material 5. The windows 306a and 306b have the same size and are located close to each other.

Alternatively, an image recording operation may be carried out in the manner shown in FIG. 20B. With reference to FIG. 20B, stimulable phosphor sheets A and B are placed one upon the other, and a filter F capable of absorbing part of radiation energy is inserted between the stimulable phosphor sheets A and B. The stimulable phosphor sheets A and B are exposed to X-rays 2, which have passed through an object 1 and a phantom 5. In this manner, the stimulable phosphor sheets A and B are simultaneously exposed to the X-rays 2 having different energy levels. The image recording operation is thus carried out for one-shot energy subtraction processing.

In the manner described above with reference to FIG. 20A or FIG. 20B, two X-ray images are stored on the stimulable phosphor sheets A and B. Thereafter, in the image read-out means shown in FIG. 3, the X-ray images are read out from the stimulable phosphor sheets A and B in the same manner as that described above, and digital image signals logSA and logSB representing the X-ray images are thereby obtained and stored on the storage medium 17.

Figure 21:
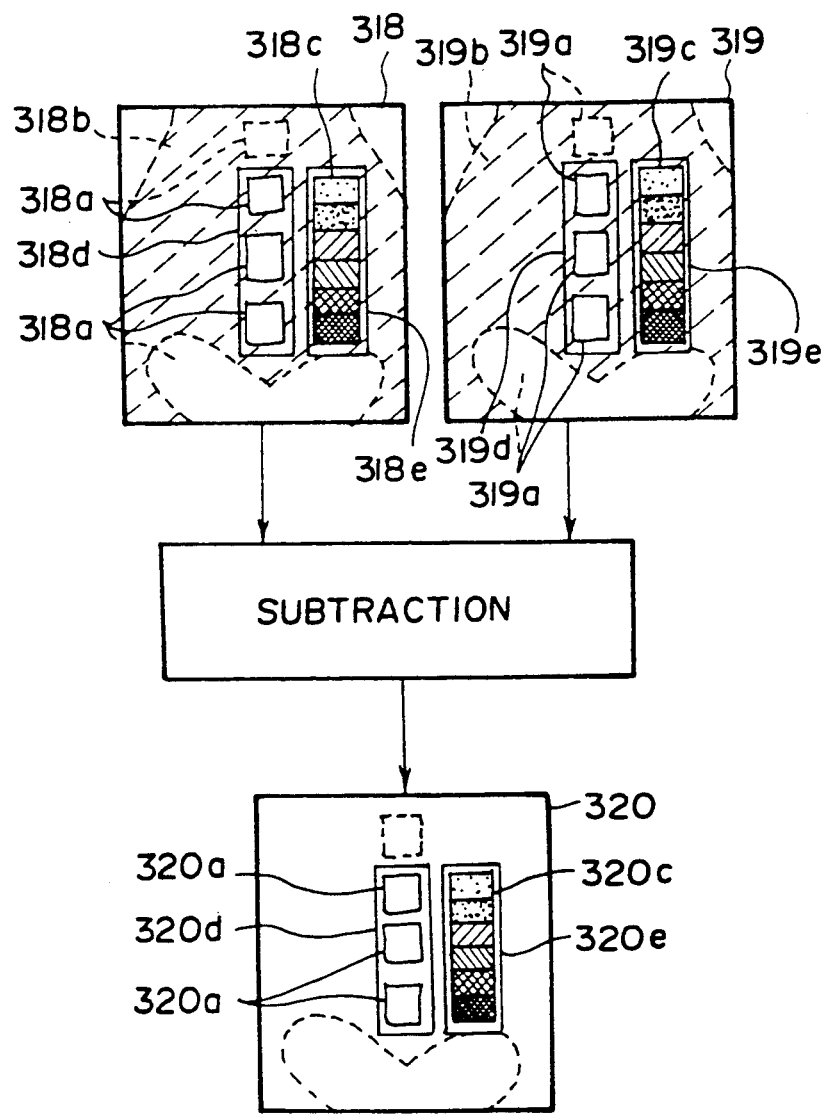
FIG. 21 is an explanatory view showing how energy subtraction processing is carried out in the embodiment of the sixth method for quantitatively analyzing bone calcium in accordance with the present invention.

FIG. 21 shows how a subtraction process is carried out on the digital image signals logSA and logSB, which have been obtained in the manner described above.

An image 318 is represented by the digital image signal logSA and was stored with the X-rays 2 produced at a low tube voltage (e.g. 60 kV) of the X-ray source 3. An image 319 is represented by the digital image signal logSB and was stored with the X-rays 2 produced at a high tube voltage (120 kV) of the X-ray source 3. The image 318 is composed of patterns 318a, 318a, . . . of the bones of the lumbar of a human body and a pattern 318b of the soft tissues, which patterns are superposed one upon the other in the region inside of a frame 318d corresponding to the window 306a of the lead plate 306. The image 318 also has a pattern 318c of the bone calcium reference material and the pattern 318b of the soft tissues, which patters are superposed one upon the other in the region inside of a frame 318e corresponding to the window 306b of the lead plate 306. Also, the image 319 is composed of patterns 319a, 319a, . . . of the bones of the lumbar of a human body and a pattern 319b of the soft tissues, which patterns are superposed one upon the other in the region inside of a frame 319d corresponding to the window 306a of the lead plate 306. The image 319 also has a pattern 319c of the bone calcium reference material and the pattern 319b of the soft tissues, which patters are superposed one upon the other in the region inside of a frame 319e corresponding to the window 306b of the lead plate 306.

The thickness, or the like, of the soft tissues varies markedly for different persons, and the corresponding patterns adversely affect the quantitative determination of the amount of bone calcium. Therefore, the image signal components of the digital image signals logSA and logSB are subtracted from each other which represent corresponding picture elements in the X-ray images 318 and 319. From the subtraction process, a bone image signal is obtained, which is expressed as $$logS = AlogSA - BlogSB + C \qquad (4)$$

wherein A, B and C denote coefficients. The bone image signal represents a bone image 320, in which the patterns 318b, 319b of the soft tissues have been erased, and only the patterns 320a, 320a, . . . of the specific part of the bones and the pattern 320c of the bone calcium reference material are formed in the regions inside of the frames 32d and 320e corresponding to the windows 306a and 306b of the lead plate 306.

The straight line 224 as shown in FIG. 19 is obtained, which represents the relationship between the image density and the amount of bone calcium and which has been obtained from the image density of the pattern 320c of the bone calcium reference material in the bone image 320.

From the straight line 224 shown in FIG. 19, when the image density of the pattern 320a of the specific part of the bones in the bone image 320 is d1, the amount of bone calcium in the specific part is found to be V1.

In the embodiment of the sixth method for quantitatively analyzing bone calcium in accordance with the present invention, the stimulable phosphor sheets. Alternatively, other recording media, such as X-ray film, may be used.

We claim:

1. A method for quantitatively analyzing bone calcium by carrying out energy subtraction processing wherein each of at least two stimulable phosphor sheets is exposed to one of at least two levels of radiation, which have different energy distributions and have passed through an object constituted of bones and soft tissues, radiation images of the object are thereby stored on the stimulable phosphor sheets, each of the stimulable phosphor sheets is thereafter exposed to stimulating rays, which cause the stimulable phosphor sheet to emit light in proportion to the amount of energy stored thereon during its exposure to the radiation, the emitted light is photoelectrically detected and converted into a digital image signal made up of a series of image signal components representing each said radiation image, the image signal components of the digital image signals thus obtained, which image signal components represent corresponding picture elements in the radiation images, are then subtracted from each other, and a difference signal is thereby obtained which represents the image of only the bones represented by the radiation images, the method for quantitatively analyzing bone calcium comprising the steps of:
i) exposing each of at least two stimulable phosphor sheets to one of at least two said levels of radiation, which have different energy distributions, without said object intervening between the stimulable phosphor sheet and a source of the radiation,
ii) thereafter exposing each of the stimulable phosphor sheets to the stimulating rays, which cause the stimulable phosphor sheet to emit light in proportion to the amount of energy stored thereon during its exposure to the radiation,
iii) photoelectrically detecting the light emitted by each of the stimulable phosphor sheets, a digital image signal being thereby obtained, which is to be used for compensating for nonuniformity in how the radiation is irradiated to the stimulable phosphor sheet, whereby at least two digital image signals to be used for the compensation are obtained with respect to at least two said levels of radiation, which have different energy distributions, iv) subtracting said digital image signals, which represent said radiation images of said object stored with at least two said levels of radiation having different energy distributions, and the corresponding digital image signals, which are to be used for the compensation, from each other, whereby digital image signals are obtained which are free of noise due to nonuniformity in how at least two said levels of radiation are irradiated to the stimulable phosphor sheets, v) subtracting said digital image signals, which are free of noise, from each other, said difference signal being thereby obtained which represents the image of only the bones represented by said radiation images, and vi) quantitatively analyzing bone calcium in said bones by utilizing said difference signal.

2. A method as defined in claim 1 wherein, when each of said radiation images of said object is stored on each of said stimulable phosphor sheets, a pattern of a bone calcium reference material is stored together with the pattern of said object, said bone calcium reference material being constituted of a plurality of sections the radiation atsorption amounts of which are known and vary step-wise, and a quantitative analysis of bone calcium is made from the image of the bones of said object by referring to the pattern of said bone calcium reference material.

3. A method as defined in claim 1 wherein each of said stimulable phosphor sheets is two-dimensionally scanned with said stimulating rays.

4. A method as defined in claim 1 wherein said stimulating rays are a laser beam.

5. A method for quantitatively analyzing bone calcium by carrying out energy substraction processing wherein each of at least two stimulable phosphor sheets is exposed to one of at least two levels of radiation, which have different energy distributions and have passed through an object constituted of bones and soft tissues, radiation images of the object are thereby stored on the stimulable phosphor sheets, each of the stimulable phosphor sheets is thereafter exposed to stimulating rays, which cause the stimulable phosphor sheet to emit light in proportion to the amount of energy stored thereon during its exposure to the radiation, the emitted light is photoelectrically detected and converted into a digital image signal made up of a series of image signal components representing each said radiation image, the image signal components of the digital image signals thus obtained, which image signal components represent corresponding picture elements in the radiation images, are then subtracted from each other, and a difference signal is thereby obtained which represents the image of only the bones represented by the radiation images, the method for quantitatively analyzing bone calcium comprising the steps of:

(i) exposing each of at least two stimulable phosphor sheets to one of at least two said levels of radiation, which have different energy distributions, without said object intervening between the stimulable phosphor sheet and a source of the radiation, (ii) thereafter exposing each of the stimulable phosphor sheets to the stimulating rays, which cause the stimulable phosphor sheet to emit light in proportion to the amount of energy stored thereon during its exposure to the radiation, (iii) photoelectrically detecting the light emitted by each of the stimulable phosphor sheets, a digital image signal being thereby obtained, which is to be used for compensating for nonuniformity in how the radiation is irradiated to the stimulable phosphor sheet, whereby at least two digital image signals to be used for the compensation are obtained with respect to at least two said levels of radiation, which have different energy distributions, (iv) subtracting said digital image signals, which represent said radiation images of said object stored with at least two said levels of radiation having different energy distributions, and the corresponding digital image signals, which are to be used for the compensation, from each other, whereby digital image signals are obtained which are free of noise due to nonuniformity in how at least two said levels of radiation are irradiated to the stimulable phosphor sheets, (v) subtracting signals, which represent distributions of scattered radiation predicted from information representing the thickness of said object, from said digital image signals which are free of noise due to nonuniformity in how at least two said levels of radiation are irradiated to the stimulable phosphor sheets, whereby said digital image signals which are free of noise are compensated for the scattered radiation, (vi) subtracting said digital image signals, which have been compensated for the scattered radiation, from each other, said difference signal being thereby obtained which represents the image of only the bones represented by said radiation images, and (vii) quantitatively analyzing bone calcium in said bones by utilizing said difference signal.

6. A method as defined in claim 5 wherein, when each of said radiation images of said object is stored on each of said stimulable phosphor sheets, a pattern of a bone calcium reference material is stored together with the pattern of said object, said bone calcium reference material being constituted of a plurality of sections the radiation absorption amounts of which are known and vary step-wise, and a quantitative analysis of bone calcium is made from the image of the bones of said object by referring to the pattern of said bone calcium reference material.

7. A method as defined in claim 5 wherein each of said stimulable phosphor sheets is two-dimensionally scanned with said stimulating rays.

8. A method as defined in claim 5 wherein said stimulating rays are a laser beam.

9. An apparatus for quantitatively analyzing bone calcium, which comprises:

i) an image read-out means for exposing stimulable phosphor sheets, on which radiation images have been stored, to stimulating rays, which cause them to emit light in proportion to the amounts of energy stored thereon during their exposures to the radiation, and photoelectrically detecting the emitted light and converting it into digital image signals, each of which is made up of a series of image signal components, ii) a subtracting operation means for:

after at least two stimulable phosphor sheets have been exposed to at least two levels of radiation having different energy distributions and having passed through an object, which is constituted of bones and soft tissues, and a bone calcium reference material constituted of a plurality of sections the radiation absorption amounts of which are known and vary step-wise, at least two radiation images of the object have thereby been stored on the stimulable phosphor sheets, each of the radiation images being composed of a pattern of said object and a pattern of said bone calcium reference material, and the radiation images have thereafter been read out by said image read-out means from the stimulable phosphor sheets and converted thereby into at least two digital image signals, each of which is made up of a series of image signal components, subtracting the image signal components of the digital image signals from each other, which image signal components represent corresponding picture elements in the radiation images, and thereby generating a difference signal representing a image of the bones and the bone calcium reference material represented by the radiation images, iii) a means for:

a) exposing each of at least two stimulable phosphor sheets to one of at least two said levels of radiation, which have different energy distributions, without said object intervening between the stimulable phosphor sheet and a source of the radiation, b) thereafter exposing each of the stimulable phosphor sheets to the stimulating rays, which cause the stimulable phosphor sheet to emit light in proportion to the amount of energy stored thereon during its exposure to the radiation, and c) photoelectrically detecting the light emitted by each of the stimulable phosphor sheets, a digital image signal being thereby obtained, which is to be used for compensating for nonuniformity in how the radiation is irradiated to the stimulable phosphor sheet, whereby at least two digital image signals to be used for the compensation are obtained with respect to at least two said levels of radiation, which have different energy distributions, iv) a means for subtracting said digital image signals, which represent said radiation images of said object and said bone calcium reference material stored with at least two said levels of radiation having different energy distributions, and the corresponding digital image signals, which are to be used for the compensation, from each other, whereby digital image signals are obtained which are free of noise due to nonuniformity in how at least two said levels of radiation are irradiated to the stimulable phosphor sheets, and v) a means for reproducing an image of said bones and said bone calcium reference material from said difference signal.

10. An apparatus as defined in claim 9 wherein each of said stimulable phosphor sheets is two-dimensionally scanned with said stimulating rays.

11. An apparatus as defined in claim 9 wherein said stimulating rays are a laser beam.

12. A method for quantitatively analyzing bone calcium, which comprises the steps of:

i) exposing each of a plurality of recording media to one of several levels of radiation, which have different energy distributions and have passed through an object and a bone calcium reference material, which simulates amounts of bone calcium varying step-wise, the object being constituted of bones and soft tissues, whereby a plurality of radiation images are recorded on the recording media, ii) forming a bone image, in which only the patterns of the bones of the object have been formed or emphasized, from the plurality of the radiation images, and iii) quantitatively analyzing bone calcium in the bones by comparing the image density of the patterns of the bones with the image density of the pattern of the bone calcium reference material, both patterns appearing in the bone image, wherein the improvement comprises the steps of:

a) when each of the plurality of said radiation images is recorded on each of said recording media, recording patterns of a plurality of bone calcium blocks, which are spaced away from one another and simulate a predetermined amount of bone calcium, together with the pattern of said object and the pattern of said bone calcium reference material on each said recording medium, b) obtaining said bone image from the plurality of said radiation images, which have thus been recorded, c) forming a calibration curve from image densities of said patterns of the plurality of said bone calcium blocks, which patterns appear in said bone image, said calibration curve being used in compensating for a difference in the image density for different positions of patterns of part of said object and part of said bone calcium reference material, which parts have a predetermined amount of bone calcium, in said bone image, and d) in accordance with said calibration curve, eliminating an error in finding the amount of bone calcium in a specific part of the bones, which error is caused to occur by a difference in the position between the pattern of said specific part of the bones and the pattern of said bone calcium reference material in said bone image.

13. A method as defined in claim 12 wherein said recording media are stimulable phosphor sheets.

14. A method as defined in claim 12 wherein said recording media are photographic film.

15. A method for quantitatively analyzing bone calcium, which comprises the steps of:

i) exposing each of a plurality of recording media to one of several levels of radiation, which have different energy distributions and have passed through an object and a bone calcium reference material, which simulates amounts of bone calcium varying step-wise, the object being constituted of bones and soft tissues, whereby a plurality of radiation images are recorded on the recording media, ii) forming a bone image, in which only the patterns of the bones of the object have been formed or emphasized, from the plurality of the radiation images, and iii) quantitatively analyzing bone calcium in the bones by comparing the image density of the patterns of the bones with the image density of the pattern of the bone calcium reference material, both patterns appearing in the bone image, wherein the improvement comprises the steps of:

a) detecting background signal components, which represent a background region other than said patterns of the bones and said pattern of said bone calcium reference material in said bone image, from an image signal made up of a series of image signal components representing said bone image, b) from said background signal components, which have thus been detected, predicting background signal components, which are superposed upon the image signal components representing said patterns of the bones and said pattern of said bone calcium reference material, c) forming a calibration curve from said background signal components, which have thus been predicted, said calibration curve being used in compensating for a difference in the image density for different positions of patterns of part of said object and part of said bone calcium reference material, which parts have a predetermined amount of bone calcium, in said bone image, and d) in accordance with said calibration curve, eliminating an error in finding the amount of bone calcium in a specific part of the bones, which error is caused to occur by a difference in the position between the pattern of said specific part of the bones and the pattern of said bone calcium reference material in said bone image.

16. A method as defined in claim 15 wherein said recording media are stimulable phosphor sheets.

17. A method as defined in claim 15 wherein said recording media are photographic film.

18. A method for quantitatively analyzing bone calcium, which comprises the steps of:

i) locating an object, which is constituted of bones and soft tissues, and a bone calcium reference material constituted of a plurality of bone calcium blocks, which simulate different amounts of bone calcium and have projected areas larger than the projected area of a specific part of the bones of said object, such that said specific part of the bones of said object and said bone calcium reference material overlap one upon the other in their projected image, ii) exposing each of a plurality of recording media to one of several levels of radiation, which have different energy distributions and have passed through said object and said bone calcium reference material overlapping one upon the other, whereby a plurality of radiation images are recorded on the recording media, iii) forming a bone image, in which only the patterns of the bones of the object have been formed or emphasized, from the plurality of the radiation images, and iv) quantitatively determining the amount of bone calcium in said specific part of the bones by comparing the image density of the pattern of said specific part of the bones with the image density of the pattern of said bone calcium reference material, both patterns appearing in the bone image.

19. A method as defined in claim 18 wherein said recording media are stimulable phosphor sheets.

20. A method as defined in claim 18 wherein said recording media are photographic film.

21. A method for quantitatively analyzing bone calcium, which comprises the steps of:

i) blocking areas other than a specific part of bones of an object, which is constituted of the bones and soft tissues, and other than a bone calcium reference material, which simulates amounts of bone calcium varying step-wise, from radiation, said blocked areas being in the vicinity of said specific part of the bones and said bone calcium reference material, ii) exposing each of a plurality of recording media to one of several levels of radiation, which have different energy distributions and have passed through said specific part of the bones of said object and said bone calcium reference material, whereby a plurality of radiation images are recorded on the recording media, iii) forming a bone image, in which only the patterns of the bones of the object have been formed or emphasized, from the plurality of the radiation images, and iv) quantitatively determining the amount of bone calcium in said specific part of the bones by comparing the image density of the pattern of said specific part of the bones with the image density of the pattern of said bone calcium reference material, both patterns appearing in the bone image.

22. A method as defined in claim 21 wherein said recording media are stimulable phosphor sheets.

23. A method as defined in claim 21 wherein said recording media are photographic film.

* * * * *